(12) United States Patent
Suda

(10) Patent No.: US 6,597,868 B2
(45) Date of Patent: Jul. 22, 2003

(54) FOCUS DETECTING DEVICE DETERMINING FOCUSING STATE BASED ON PHASE DIFFERENCE INFORMATION

(75) Inventor: Yasuo Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/834,790

(22) Filed: Apr. 13, 2001

(65) Prior Publication Data

US 2001/0036361 A1 Nov. 1, 2001

(30) Foreign Application Priority Data

Apr. 19, 2000 (JP) .................................... 2000-117510

(51) Int. Cl.$^7$ .............................................. G03B 13/00
(52) U.S. Cl. ...................................................... 396/111
(58) Field of Search ................... 396/111, 104, 396/128

(56) References Cited

U.S. PATENT DOCUMENTS 5,499,100 A  *  3/1996  Tanaka ........................ 250/548
5,784,655 A  *  7/1998  Akashi et al. ............... 396/128

* cited by examiner

*Primary Examiner*—Russell Adams
*Assistant Examiner*—Arthur A Smith
(74) *Attorney, Agent, or Firm*—Robin, Blecker & Daley

(57) ABSTRACT

In a focus detecting device of the type in which light fluxes passing through two areas obtained by dividing a pupil of an image forming lens are received by a sensor to detect a phase difference, pixels of the sensor are disposed in such a manner that the sensor has the light-receiving sensitivity in different directions with respect to the luminance distribution, and the phase-difference detection and the contrast detection are performed according to the direction of the light-receiving sensitivity so as to perform appropriate focus detection.

11 Claims, 18 Drawing Sheets

FIG. 23

$$C = \sum_{n=0}^{3} \sum_{m=0}^{7-2} |S(m+2, n) - S(m, n)| + \sum_{m=0}^{7} \sum_{n=0}^{3-2} |S(m, n+2) - S(m, n)|$$

............(1)

$$C = \sum_{n=0}^{3} \sum_{m=0}^{7-2} |S(m+2, n) - S(m, n)|$$

............(2)

FOCUS DETECTING DEVICE DETERMINING FOCUSING STATE BASED ON PHASE DIFFERENCE INFORMATION

BACKGROUND OF THE INVENTION

1. Field of the Invention

The present invention relates to an improvement on a focus detecting device for use in a digital still camera or the like.

2. Description of Related Art

In a digital color camera, a solid-state image sensor, such as a CCD or a CMOS sensor, is exposed to an image of an object for a desired period of time in response to the depression of a release button. Then, the thus-obtained image signal, which represents a still image for one picture, is converted into a digital signal, and is then subjected to a predetermined process, such as a YC process, so that an image signal of the predetermined form is obtained. The digital image signal, which represents the picked-up image, is recorded in a semiconductor memory for every image. The thus-recorded image signal is read out, as required, to be reproduced into a signal adapted for being displayed or printed, and is outputted to a monitor or the like for displaying an image.

In such a digital still camera, heretofore, focus detection for a photographic lens is performed by using an image sensor which is provided for picking up an object image. For that purpose, in many cases, a focus detecting device of the contrast detection method is used. In the focus detection of the contrast detection method, the sharpness of an object image formed by an image pickup optical system is obtained by evaluating the output of the solid-state image sensor with a predetermined function, and the position of the photographic lens on the optical axis thereof is adjusted in such a way as to make the thus-obtained functional value become a maximum. As the evaluation functions employed in the above focus detection, there are a method of adding together absolute values of differences between respective adjacent luminance signals within a focus detecting area, a method of adding together squares of differences between respective adjacent luminance signals within a focus detecting area, a method of adding together differences between respective adjacent signals in each of R, G and B image signals, etc.

In addition, there is known, as disclosed in U.S. Pat. No. 4,410,804, a focus detecting device of the phase-difference detection method. In the focus detection of the phase-difference detection method, a pair of or two pairs of light-receiving parts are provided for respective micro lens arrays which are arranged in two-dimensional manner, and every light-receiving part is projected onto the pupil of an image pickup optical system by the corresponding micro lens array. Then, object images are formed by using two light fluxes having passed through different portions of the pupil of the image pickup optical system, and the positionally phase difference between the two object images is detected on the basis of the output of an image sensor and is then converted into the amount of defocus of the image pickup optical system.

In the focus detection of the phase-difference detection method, it is possible to obtain not only the direction of defocus but also the amount of defocus itself. Accordingly, there is an advantage that it is possible to greatly reduce a period of time required for realizing an in-focus state, as compared with the contrast detection method.

Further, there is known, as disclosed in Japanese Laid-Open Patent Application No. Sho 59-146010, a focus detecting device having both of the contrast detection method and the phase-difference detection method.

Incidentally, each of the phase-difference detection method and the contrast detection method is arranged to act by capturing the luminance distribution of an object and is, therefore, called the passive-type focus detection, which is distinguished from the active-type focus detection in which focus detection is performed by emitting rays of light toward the object from the camera.

In the case of the passive-type focus detection, the success or failure in focus detection depends on the luminance distribution of an object serving as a focus detection target. The luminance distribution exists in various ways, including a way in which the luminance is distributed in a random manner, a way in which the luminance is distributed only in the vertical direction, a way in which the luminance is distributed only in the horizontal direction, etc. For example, in a case where a person wearing vertical-striped clothes is to be photographed, if a focus detecting point is adjusted to the clothes, the luminance of the person almost never changes in the vertical direction, which is parallel with the stripe of the clothes, and greatly changes in the horizontal direction, which is perpendicular to the stripe. It goes without saying that, if there is no change of the luminance of the object, an effective output can not be obtained in the passive-type focus detection. Accordingly, it is understood that the direction of the luminance distribution giving sensitivity is an extremely important factor for the passive-type focus detecting device.

In the above-mentioned U.S. Pat. No. 4,410,804, there is also disclosed a focus detecting device of the phase-difference detection method having sensitivity both in the luminance distributions in the vertical direction and horizontal directions. Thus, the focus detection giving sensitivity both in the luminance distributions in the vertical direction and horizontal directions is realized by providing two pairs of, namely, four, photoelectric transducing parts for every micro lens. However, the provision of four photoelectric transducing parts for every micro lens necessitates the extremely-advanced minimization of a solid-state image sensor, so that it is difficult to supply such a solid-state image sensor, as an image sensor for digital cameras, at a low price.

BRIEF SUMMARY OF THE INVENTION

In accordance with an aspect of the invention, there is provided a focus detecting device, comprising a sensor part arranged to receive a light flux passing through an image forming lens, the sensor part including a first pixel part having pixels arrayed in a first direction and a second pixel part having pixels arrayed in a second direction different from the first direction, and a computing circuit arranged to obtain information for focusing by performing a phase-difference computing operation for computing a phase difference between two images formed with light fluxes passing through different exit pupils of the image forming lens on the basis of a signal obtained by the first pixel part and by performing a computing operation different from the phase-difference computing operation on the basis of a signal obtained by the second pixel part.

In accordance with another aspect of the invention, there is provided a focus detecting device, comprising a sensor composed of a plurality of pixel units, each pixel unit having a first photoelectric transducing element and a second photoelectric transducing element, an optical element arranged to cause, among light fluxes passing through first and second exit pupils of an image forming lens, a light flux passing through the first exit pupil to be received by the first photoelectric transducing element of each pixel unit and to cause a light flux passing through the second exit pupil to be received by the second photoelectric transducing element, and a computing circuit arranged to compute a focusing state on the basis of a phase difference between a signal obtained by the first photoelectric transducing element of each pixel unit and a signal obtained by the second photoelectric transducing element of each pixel unit and arranged to compute a focusing state by using, as a signal for each pixel unit, a signal obtained by combining signals obtained by the first photoelectric transducing element and the second photoelectric transducing element of each pixel unit.

In accordance with a further aspect of the invention, there is provided a focus detecting device, comprising a focus detecting control part having a first mode, for small defocus, of causing a member having two aperture parts to be located between an image forming lens and a sensor part and causing a light flux passing through the two aperture parts to be received by the sensor part, and a second mode, for large defocus, of causing a light flux passing through the image forming lens without passing through the two aperture parts to be received by the sensor part, and a computing circuit arranged to detect a phase difference between two images received by the sensor part irrespective of the first mode or the second mode.

In accordance with a still further aspect of the invention, there is provided a focus detecting device, comprising a sensor part composed of a plurality of pixel units, the plurality of pixels units including at least a first array in which a plurality of pixel units are arrayed in a first direction and a second array disposed parallel with the first array, each pixel unit having a first photoelectric transducing element and a second photoelectric transducing element, the plurality of pixel units constituting the first array being disposed in such a way as to receive a light flux passing through a first color filter at intervals of a predetermined number of pixel units, the plurality of pixel units constituting the second array being disposed in such a way as to receive a light flux passing through the first color filter at intervals of a predetermined number of pixel units, every pixel unit of the second array arranged to receive a light flux passing through the first color filter being shifted by a predetermined number of pixel units from every pixel unit of the first array arranged to receive a light flux passing through the first color filter, an optical element arranged to cause, among light fluxes passing through first and second exit pupils of an image forming lens, a light flux passing through the first exit pupil to be received by the first photoelectric transducing element of each pixel unit and to cause a light flux passing through the second exit pupil to be received by the second photoelectric transducing element of each pixel unit, and a computing circuit arranged to obtain a phase difference on the basis of information on a phase difference between signals obtained by the first photoelectric transducing element and the second photoelectric transducing element of every pixel unit of the first array arranged to receive a light flux passing through the first color filter and information on a phase difference between signals obtained by the first photoelectric transducing element and the second photoelectric transducing element of every pixel unit of the second array arranged to receive a light flux passing through the first color filter.

The above and further aspects and features of the invention will become apparent from the following detailed description of a preferred embodiment thereof taken in conjunction with the accompanying drawings.

BRIEF DESCRIPTION OF THE SEVERAL VIEWS OF THE DRAWINGS

FIG. 23 is a diagram showing the computing formulas actually used for calculating a contrast evaluation value in the embodiment of the invention.

DETAILED DESCRIPTION OF THE INVENTION

Hereinafter, a preferred embodiment of the invention will be described in detail with reference to the drawings.

First, an image pickup optical system for use in the embodiment of the invention will be described.

Figure 1:
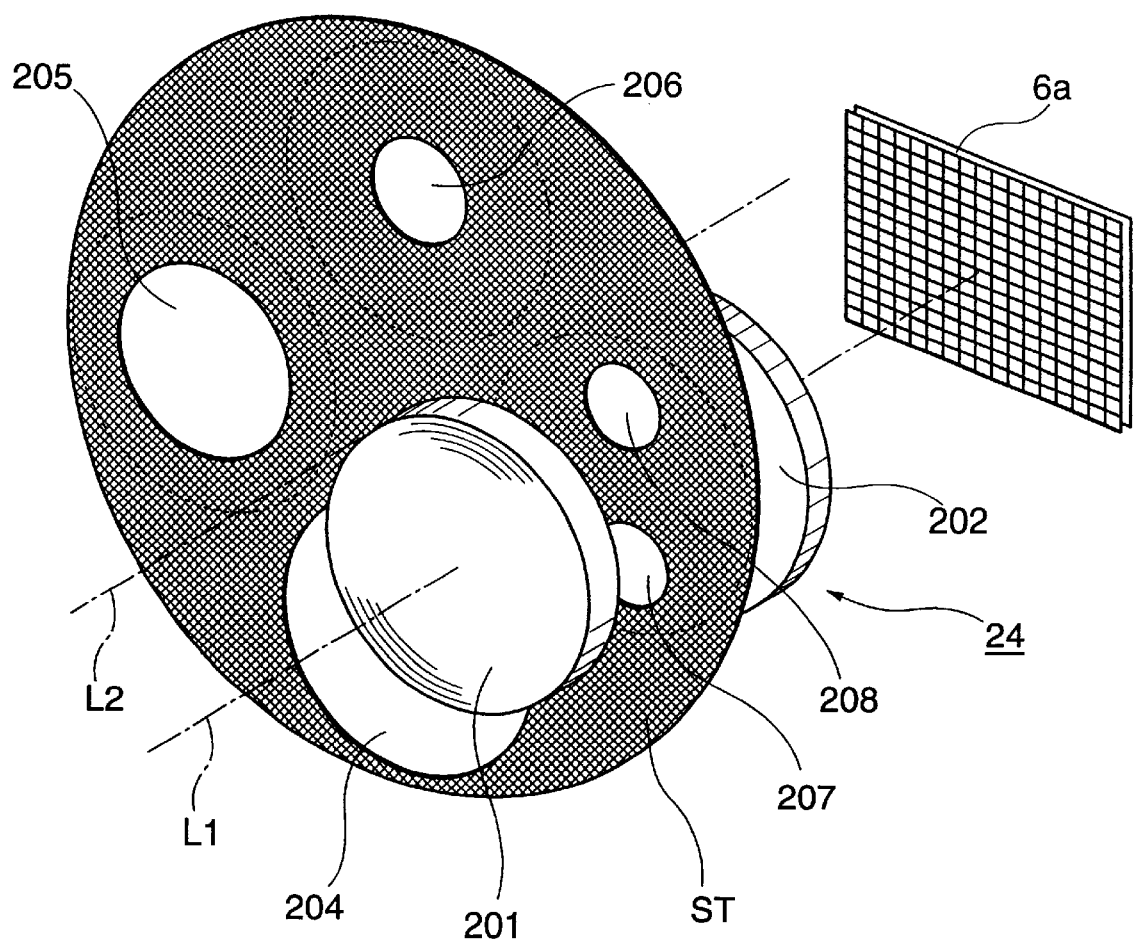
FIG. 1 is a diagram showing the construction of an image pickup optical system according to an embodiment of the invention.

FIG. 1 is a diagram showing the construction of the image pickup optical system 24 according to the embodiment of the invention, which is an optical system for a digital color camera using a solid-state image sensor. In FIG. 1, the left-hand side thereof is on the object side, and the right-hand side thereof is on the image plane side. With a light flux having passed through the image pickup optical system 24, an object image is formed on an area sensor part 6a of the solid-state image sensor.

In FIG. 1, reference numeral 201 denotes a front lens group, of the image pickup optical system 24, disposed on the object side of a stop ST, and reference numeral 202 denotes a rear lens group, of the image pickup optical system 24, disposed on the image side of the stop ST and including lens elements and an optical low-pass filter (LPF).

The stop ST is arranged to selectively take four positions by being rotated around an axis L2 by a driving force of a motor (not shown). Further, the stop ST is provided with five apertures 204 to 208. The apertures 204, 205 and 206 are apertures to be used for an image pickup operation, and the apertures 207 and 208 are apertures to be used for a focus detecting operation for large defocus.

Figure 2:
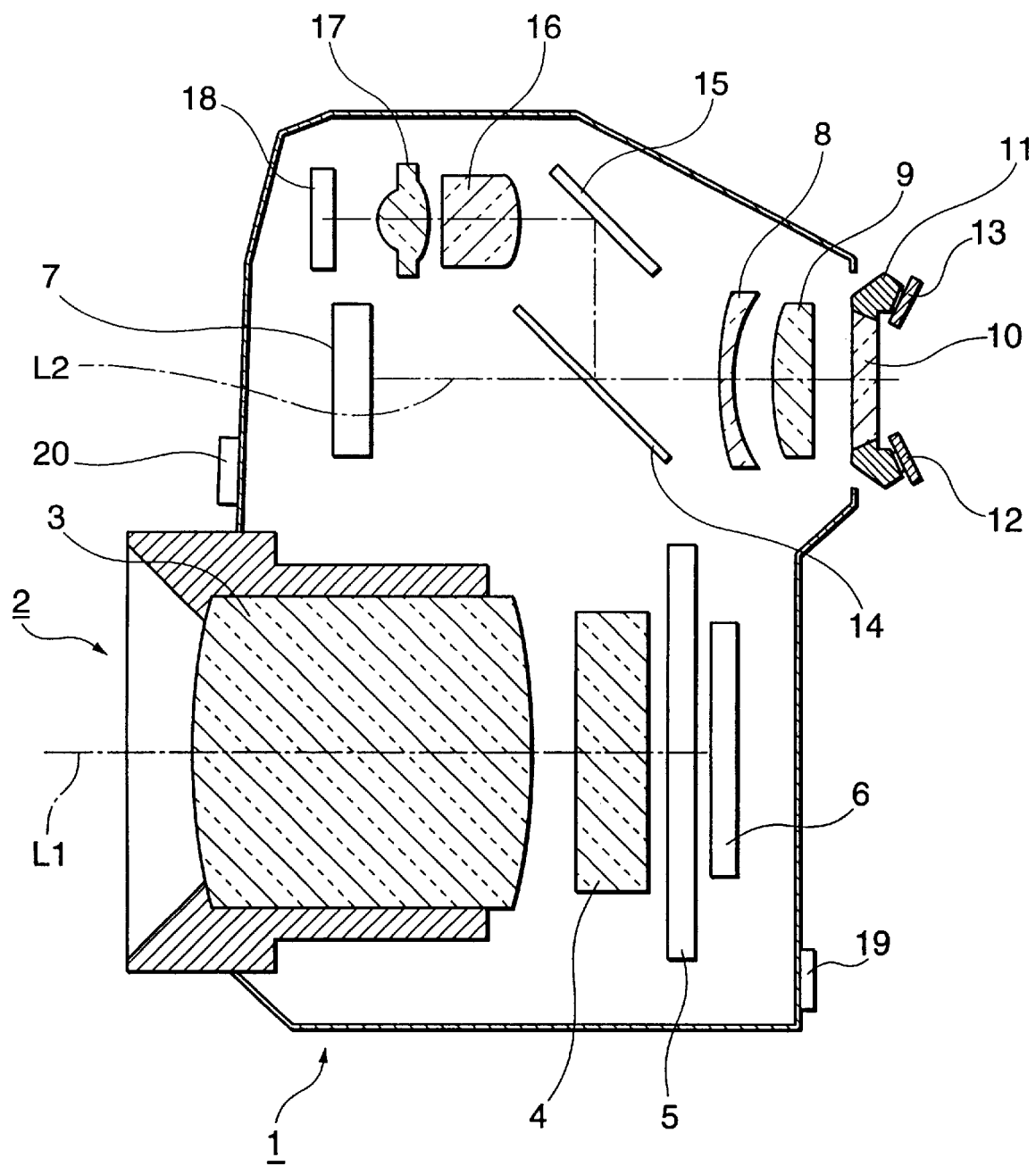
FIG. 2 is a diagram showing the construction of a digital color camera having a visual-line detecting function in the embodiment of the invention.

FIG. 2 is a diagram showing the outline arrangement of the digital color camera equipped with a focus detecting device arranged to perform a first focus detecting process and a second focus detecting process according to the embodiment of the invention. The digital color camera shown in FIG. 2 is of the single plate type using a solid-state image sensor, such as a CCD or a CMOS sensor, and is arranged to obtain an image signal representing a moving image or a still image by driving the solid-state image sensor continuously or instantaneously. Here, the solid-state image sensor is an image pickup device of such a type as to convert exposure light into an electrical signal for every pixel, store electric charge corresponding to the amount of exposure light and read out the stored electric charge.

In FIG. 2, reference numeral 1 denotes a camera body, and reference numeral 2 denotes a photographic lens having an image forming lens 3 disposed therein. The photographic lens 2 is electrically or mechanically connected to the camera body 1 via a known mount, and is changeable to a photographic lens having a different focal length, thereby making it possible to obtain photographic pictures of the various angles of view. Further, the photographic lens 2 is provided with a driving mechanism (not shown), and is arranged to adjust focus for an object by moving, along an optical axis L1, a focusing lens which is an element of the image forming lens 3.

Reference numeral 4 denotes an optical low-pass filter, reference numeral 5 denotes a mechanical shutter, and reference numeral 6 denotes a solid-state image sensor. The optical low-pass filter 4 limits the cut-off frequency of the image forming lens 3 so as to prevent an object image having a spatial frequency higher than necessary from being formed on the solid-state image sensor 6. In addition, on the optical low-pass filter 4, there is formed an infrared-cut filter. The image pickup optical system 24 shown in FIG. 1 includes the image forming lens 3 and the low-pass filter 4.

An object image captured by the solid-state image sensor 6 is displayed on a liquid crystal display 7. The solid-state image sensor 6 is a sensor of the CMOS process compatible type (hereinafter referred to as "CMOS sensor"), which is one of amplification-type solid-state image pickup devices. One of characteristics of the CMOS sensor is that, since MOS transistors of an area sensor part and MOS transistors of a peripheral circuit can be formed by one and the same process, it is possible to greatly reduce the number of masks and the number of processes as compared with a CCD. With such a characteristic utilized, electric charges obtained at two photoelectric transducing parts can be transferred together or separately to a floating diffusion area (hereinafter referred to as "FD part"). Accordingly, only by controlling the timing of a transfer MOS transistor connected to the FD part, it is possible to easily perform the addition and non-addition of signal charges of the two photoelectric transducing parts.

The solid-state image sensor 6, with such a construction utilized, is changeable between a first output mode of receiving a light flux passing through the whole of an exit pupil of the photographic lens 2 and a second output mode of receiving a light flux passing through a part of the exit pupil of the photographic lens 2, and the output of the solid-state image sensor 6 is used to perform, in addition to an image pickup process, a first focus detecting process and a second focus detecting process.

More specifically, the first output mode is used for the image pickup process, the second focus detecting process and a viewfinder output process, while the second output mode is used for the first focus detecting process, the second focus detecting process and the viewfinder output process. In the first output mode, in which the addition of signals is performed in units of pixel, it is possible to obtain a signal having a little noise as compared with the method of adding together signals after reading-out thereof.

Reference numerals 8 and 9 denote a concave lens and a convex lens, respectively, which are provided for observing the liquid crystal display 7 and have a positive refractive power as a whole. Reference numeral 10 denotes an eyeball illuminating prism, serving also as a protector for the viewfinder optical system. A part of the eyeball illuminating prism 10 which is used as a viewfinder optical path is composed of parallel flat plates and is used also as a window member of the viewfinder optical system. Thus, the concave lens 8, the convex lens 9 and the eyeball illuminating prism 10 constitute the viewfinder optical system. The diopter of the viewfinder optical system can be adjusted by moving the convex lens 9 along a viewfinder optical axis L2, thereby making it possible to provide the observer with an appropriate view of the liquid crystal display 7. Reference numerals 12 and 13 denote diffusing plates arranged to diffuse light exiting from the eyeball illuminating prism 10 toward a specified surface.

Figure 3:
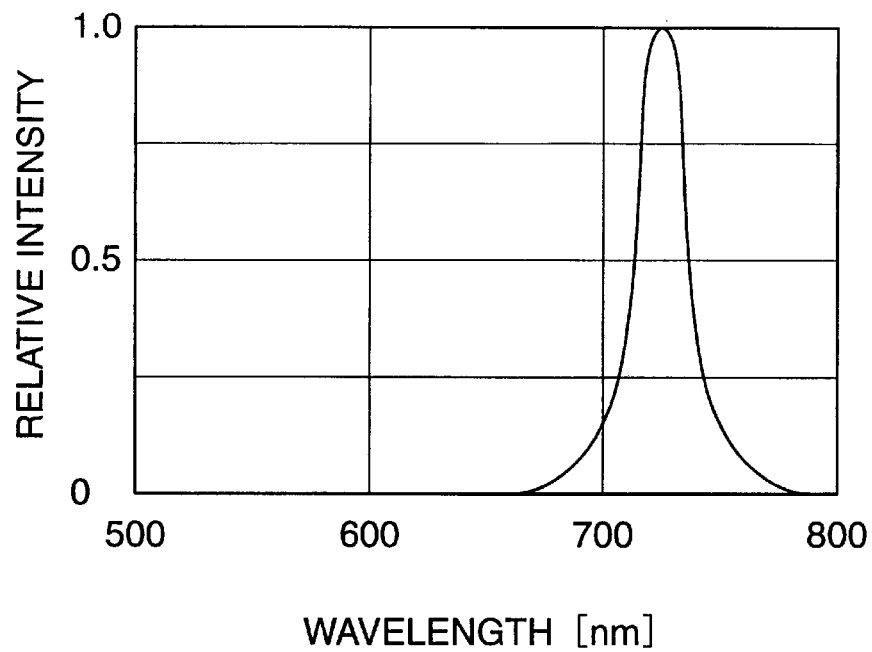
FIG. 3 is a graph showing the light-emission characteristic of an LED in the embodiment of the invention.

On the two sides of the eyeball illuminating prism 10, there are mounted a plurality of LEDs 11 arranged to emit red light of the light-emission characteristic shown in FIG. 3. For example, light emitted from the LED 11 passes through the inside of the eyeball illuminating prism 10, and then exits outside the camera after passing through the diffusing plate 12. Thus, the eyeball illuminating prism 10, the LEDs 11 and the diffusing plates 12 and 13 constitute an eyeball illuminating system arranged to illuminate the eye part of the observer.

The light-emission center wavelength of the LED 11 is 720 nm, at which the relative luminous efficiency is considerably low. However, since the foot of the light-emission intensity reaches toward the short wavelength side, light emitted from the LED 11 is sufficiently visible. Accordingly, it is possible for the observer, if having intention, to know the operating state of a visual-line detecting device through the light emission of the LED 11.

On the respective effective parts of the concave lens 8, the convex lens 9 and the eyeball illuminating prism 10 corresponding to the viewfinder optical path, there is formed a transmission-intensifying coating with respect to the wavelengths from the visible spectrum to 720 nm or thereabout, including the light-emission wavelength of the LED 11. This coating is provided for preventing the illumination for the eye part from reflecting from the viewfinder optical system, returning to the eye part and then appearing as red ghost, and for preventing, as much as possible, ghost from being superposed on a visual-line sensor 18.

In the optical path of the viewfinder optical system, there is disposed a dichroic mirror 14 between the liquid crystal display 7 and the concave lens 8, which is arranged to reflect, upward, light coming in from the outside of the viewfinder optical system.

Figure 4:
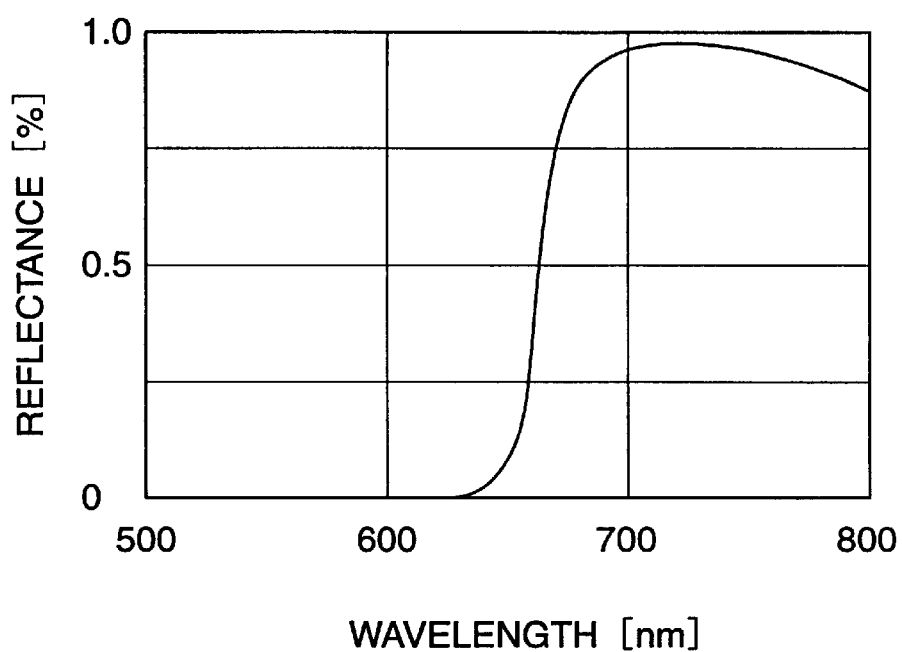
FIG. 4 is a graph showing the spectral reflectance characteristic of a dichroic mirror in the embodiment of the invention.

FIG. 4 is a graph showing the spectral reflectance characteristic of the dichroic mirror 14, in which the sharp-cut characteristic with the half value set to 670 nm is shown. Accordingly, light of the light-emission wavelength region, as shown in FIG. 3, emitted from the LED 11 is reflected by the dichroic mirror 14, so that reflected light from the eye part of the observer illuminated by the LED 11 is reflected upward by the dichroic mirror 14 after reversely passing through the eyeball illuminating prism 10, the convex lens 9 and the concave lens 8.

On the other hand, components having wavelengths shorter than 670 nm of an image displayed on the liquid crystal display 7 pass through the dichroic mirror 14 and then exit from the viewfinder optical system through the concave lens 8, the convex lens 9 and the eyeball illuminating prism 10, which is a window member of the viewfinder optical system. In this instance, although components having wavelengths longer than 670 nm are cut off by the dichroic mirror 14, the relative luminous efficiency at such a wavelength region is low, and, therefore, the viewfinder optical system provides no unnatural viewfinder image.

Above the dichroic mirror 14, there are disposed a mirror 15, a prism 16, a lens 17 and the visual-line image sensor 18. Reflected light from the eye part of the observer reaches, after an optical path thereof is bent by the mirror 15, the visual-line sensor 18 through the prism 16 and the lens 17, so that an image of the eye part of the observer is formed on the visual-line sensor 18. Thus, the fixation point of the observer is detected by processing the image of the eye part of the observer. Reference numeral 19 denotes a main switch, and reference numeral 20 denotes a release button.

Figure 5:
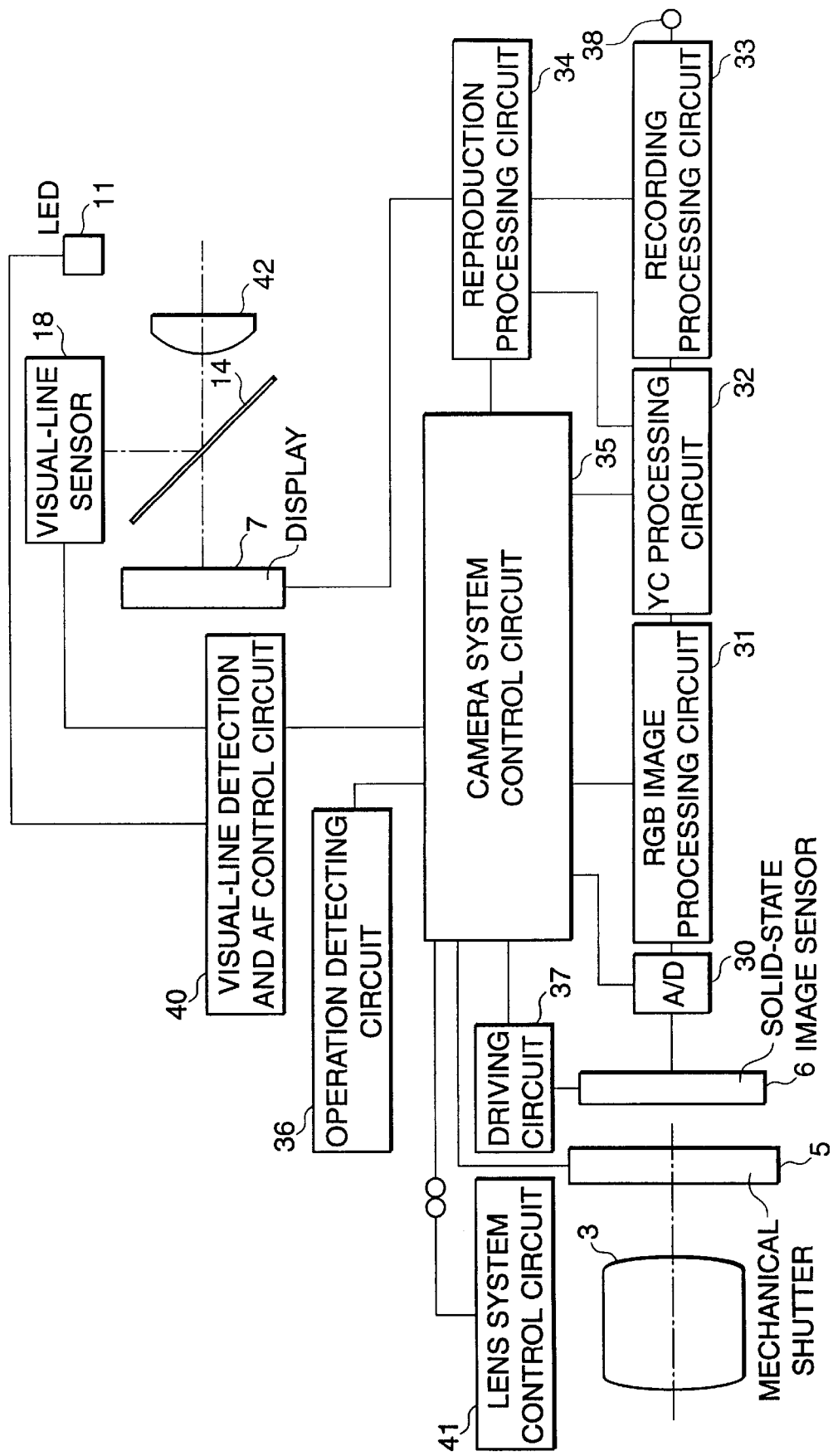
FIG. 5 is a block diagram showing the electrical arrangement of the digital color camera shown in FIG. 2.

FIG. 5 is a block diagram showing the electrical arrangement of the digital color camera.

First, a portion of the digital color camera related to an image pickup operation and an image recording operation is described below. The digital color camera includes an image pickup system, an image processing system, a recording and reproducing system and a control system. The image pickup system includes the image forming lens 3, the mechanical shutter 5 and the solid-state image sensor 6, and the image processing system includes an A/D converter 30, an RGB image processing circuit 31, and a YC processing circuit 32.

Further, the recording and reproducing system includes a recording processing circuit 33 and a reproduction processing circuit 34, and the control system includes a camera system control circuit 35, an operation detecting circuit 36 and a solid-state image sensor driving circuit 37. Reference numeral 38 denotes a standardized connection terminal which is to be connected to an external computer or the like so as to communicate data therewith.

The image pickup system is an optical processing system arranged to cause light from an object to be imaged on an image pickup plane of the solid-state image sensor 6 through the image forming lens 3. In this instance, the stop ST of the photographic lens 2 and, if necessary, the mechanical shutter 5 are adjusted to make the solid-state image sensor 6 exposed to an object image having an appropriate amount of light. The solid-state image sensor 6 is an image pickup device having 3,700 pixels in the longer-side direction and 2,800 pixels in the shorter-side direction, i.e., about 10,000,000 pixels in total. On the front surfaces of the pixels of the solid-state image sensor 6, there are disposed optical filters of primary colors, i.e., red (R), green (G) and blue (B) in a mosaic manner.

Image signals read out from the solid-state image sensor 6 are supplied to the image processing system via the A/D converter 30. The A/D converter 30 is a signal conversion circuit arranged to convert the image signals into digital signals of, for example, 10 bits corresponding to the amplitudes of signals of the respective pixels as exposed. An image signal processing operation subsequent to the A/D converter 30 is performed with digital signals. The image processing system is a signal processing system arranged to obtain an image signal of the desired format from the R, G and B digital signals, i.e., to convert R, G and B color signals into a YC signal, or the like, composed of a luminance signal Y and color-difference signals R-Y and B-Y.

The RGB image processing circuit 31 is a signal processing circuit arranged to process image signals of "3,700×2,800 pixels" received from the solid-state image sensor 6 via the A/D converter 30, and includes a white-balance circuit, a gamma correction circuit and an interpolation computing circuit which is provided for obtaining a high-resolution image signal by means of interpolation computing.

The YC processing circuit 32 is a signal processing circuit arranged to form a luminance signal Y and color-difference signals R-Y and B-Y, and is composed of a high-frequency luminance signal generating circuit for generating a high-frequency luminance signal YH, a low-frequency luminance signal generating circuit for generating a low-frequency luminance signal YL, and a color-difference signal generating circuit for generating color-difference signals R-Y and B-Y. The luminance signal Y is formed by combining together the high-frequency luminance signal YH and the low-frequency luminance signal YL.

The recording and reproducing system is a processing system arranged to output an image signal to a memory and to output an image signal to the liquid crystal display 7. The recording processing circuit 33 performs a writing process and a reading process on an image signal with respect to the memory, and the reproduction processing circuit 34 reproduces an image signal read out from the memory and displays the thus-reproduced image on the liquid crystal display 7.

Further, the recording processing circuit 33 contains therein a compression and expansion circuit arranged to compress a YC signal, which represents a still image or a moving image, with a predetermined compression method and to expand compressed data as read out. The compression and expansion circuit includes a frame memory for signal processing, etc., and is arranged to store, in the frame memory, a YC signal supplied from the image processing system for every frame and to perform a compression encoding process on the YC signal by reading out signals from every plurality of blocks. The compression encoding process is performed, for example, by two-dimensional-quadrature-transforming, normalizing and Huffman-coding an image signal for every block.

The reproduction processing circuit 34 is a circuit arranged to matrix-transform a luminance signal Y and color-difference signals R-Y and B-Y into, for example, R, G and B signals. The transformed signals obtained by the reproduction processing circuit 34 are outputted to the liquid crystal display 7, on which a visual image is displayed for reproduction.

On the other hand, the control system includes the operation detecting circuit 36, which is arranged to detect the operations of the release button 20, etc., the camera system control circuit 35, which is arranged to generate and output a timing signal for the image pickup operation, etc., and the solid-state image sensor driving circuit 37, which is arranged to generate a driving signal for driving the solid-state image sensor 6 under the control of the camera system control circuit 35. Further, the control system controls the image pickup system, the image processing system and the recording and reproducing system in response to an external operation, and, for example, controls the driving of the solid-state image sensor 6, the operation of the RGB image processing circuit 31 and the compression processing of the recording processing circuit 33 upon detection of the depression of the release button 20.

Next, a portion of the digital color camera related to the visual-line detection and the focus adjustment is described.

To the camera system control circuit 35, there are connected a visual-line detection and AF control circuit 40 and a lens system control circuit 41. The visual-line detection and AF control circuit 40 and the lens system control circuit 41 communicate, with each other through the camera system control circuit 35, data required to perform the respective processing operations.

The visual-line detection and AF control circuit 40 detects the fixation point of the observer on the viewfinder filed on the basis of an image of the eye part of the observer projected on the visual-line sensor 18 through the viewfinder optical system 42. The viewfinder optical system 42 is composed of the concave lens 8, the convex lens 9 and the eyeball illuminating prism 10 shown in FIG. 2.

On the basis of information on the fixation point on the viewfinder field, the visual-line detection and AF control circuit 40 sets a focus detecting point on the fixation point so as to adjust the focus of the image forming lens 3 to an object image corresponding to the position of the fixation point, and detects a focusing state of the focus detecting point to detect the amount of defocus. Then, the visual-line detection and AF control circuit 40 converts the detected amount of defocus into an amount of driving for the focusing lens, which is one of elements of the image forming lens 3, and sends the amount of driving for the focusing lens to the lens system control circuit 41 via the camera system control circuit 35.

Upon receiving the amount of driving for the focusing lens, the lens system control circuit 41 adjusts the focus of the focusing lens to an object on the fixation point by moving the focusing lens along the optical axis L1 with a driving mechanism (not shown) of the photographic lens 2. Further, when information indicating that the object on the fixation point is in focus is detected by the visual-line detection and AF control circuit 40, such information is transmitted to the camera system control circuit 35, so that an image pickup operation is permitted by the camera system control circuit 35. In this instance, if the release button 20 is depressed, an image pickup control operation is performed by the image pickup system, the image processing system and the recording and reproducing system, as mentioned in the foregoing.

Now, the construction of the solid-state image sensor 6 is described below.

The solid-state image sensor 6 is not only an element for picking up an object image but also an element for obtaining a signal used for focus detection. The focus detecting process includes a first focus detecting process using the phase-difference detection method and a second focus detecting process using the contrast detection method.

Figure 6:
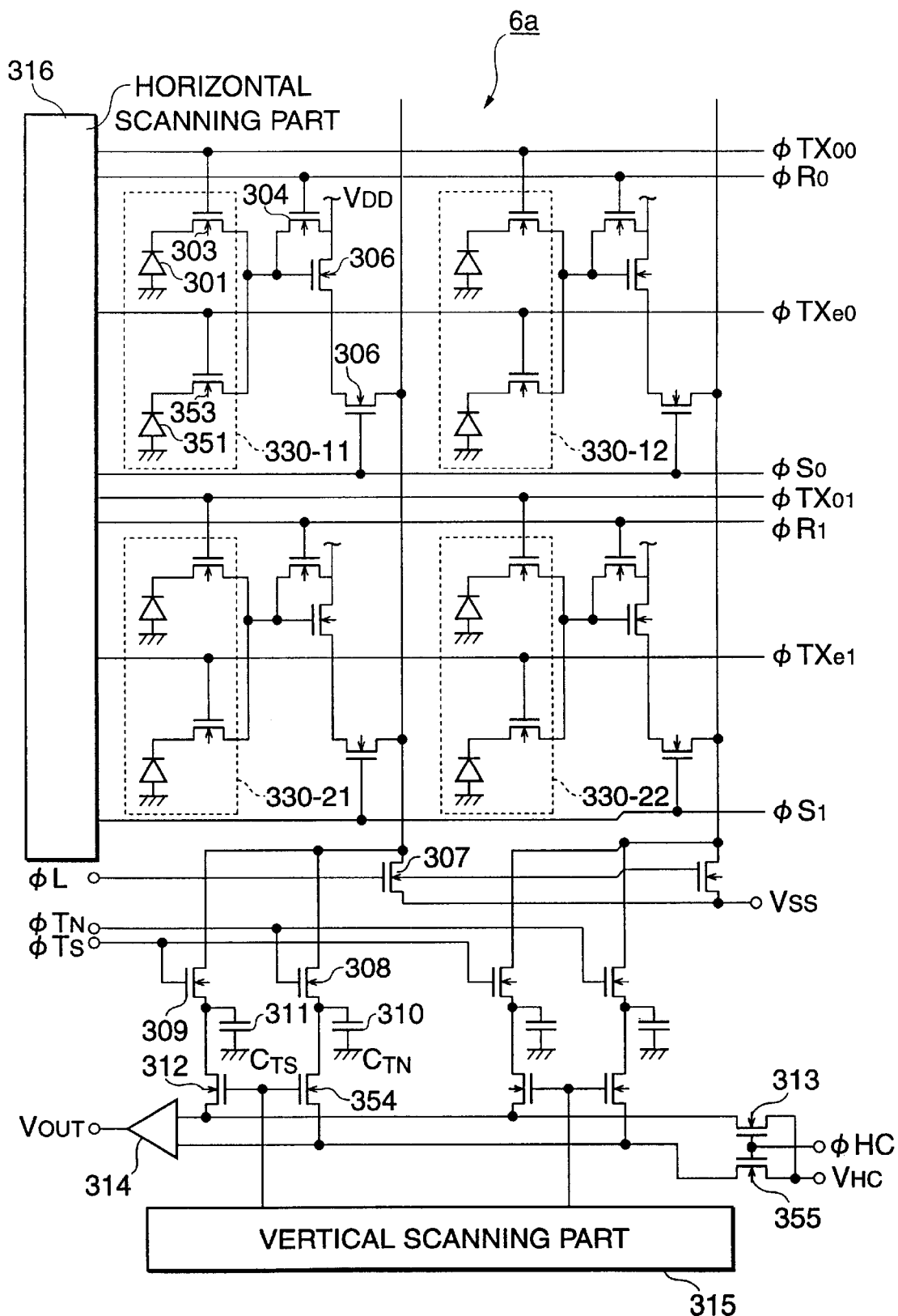
FIG. 6 is a diagram showing the circuit construction of an area sensor part within a solid-state image sensor in the embodiment of the invention.

FIG. 6 is a diagram showing the circuit construction of an area sensor part 6a within the solid-state image sensor 6. In FIG. 6, a two-dimensional area sensor having "two columns×two rows" pixels is shown. However, in actuality, the area sensor 6a has such a great number of pixels as "2,800 columns×3,700 rows" so as to obtain a practical resolution.

Referring to FIG. 6, the area sensor part 6a includes first and second photoelectric transducing parts 301 and 351 composed of pn photodiodes, transfer switch MOS transistors 303 and 353, a resetting MOS transistor 304, a source-follower amplifying MOS transistor 305, a vertical selection switch MOS transistor 306, a source-follower load MOS transistor 307, a dark output transfer MOS transistor 308, a bright output transfer MOS transistor 309, a dark output storing capacitance ($C_{TN}$) 310, a bright output storing capacitance ($C_{TS}$) 311, vertical transfer MOS transistors 312 and 354, vertical output line resetting MOS transistors 313 and 355, a differential output amplifier 314, a vertical scanning part 315 and a horizontal scanning part 316.

Figure 7:
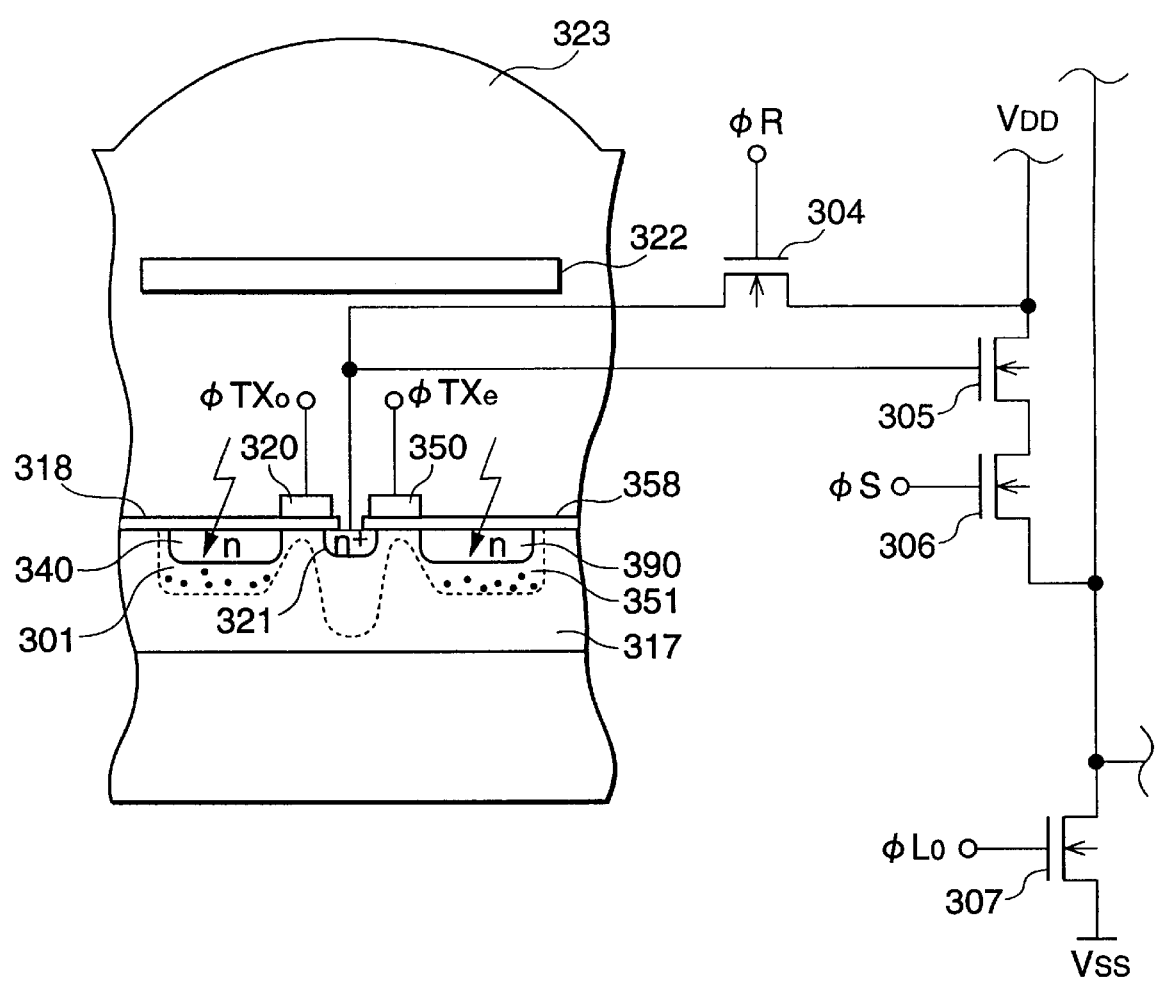
FIG. 7 is a sectional view showing a light-receiving part in the embodiment of the invention.

FIG. 7 is a sectional view of a light-receiving part (for example, 330-11). Light-receiving parts 330-21, 330-12, 330-22, etc., have the same construction as that of the light-receiving part 330-11.

In FIG. 7, reference numeral 317 denotes a P-type well, reference numerals 318 and 358 each denote a gate oxide film, reference numerals 320 and 350 each denote a poly-silicon (poly-Si), and reference numeral 321 denotes an n+ FD part (floating diffusion area).

Reference numerals 340 and 390 each denote an n layer, which has such a density as to be able to be completely depleted. The FD part 321 is connected to the first photoelectric transducing part 301 and the second photoelectric transducing part 351 via the transfer MOS transistors 303 and 353. Electric charges as generated are completely transferred to the FD part 321 in response to control pulses φTX so that signals can be added together or can be left not added together. Incidentally, although, in FIG. 7, the first photoelectric transducing part 301 and the second photoelectric transducing part 351 are illustrated in such a way as to be at a distance from each other, a boundary portion therebetween is, in actuality, very small. Therefore, in practice, it is possible to assume that the first photoelectric transducing part 301 and the second photoelectric transducing part 351 are in contact with each other. Hereinafter, the first photoelectric transducing part 301 and the second photoelectric transducing part 351, which are adjacent to each other, are referred to, in a lump, as a light-receiving part. Further, each pixel, which includes the light-receiving part and the MOS transistor, is approximately in a square shape in layout, and the pixels are adjacently arranged in a grating manner.

Reference numeral 322 denotes a color filter which transmits light of a particular wavelength range, and reference numeral 323 denotes a micro lens arranged to efficiently guide a light flux coming from the image pickup optical system 24 to the first photoelectric transducing part 301 and the second photoelectric transducing part 351. The proportion of the light-receiving part in each pixel is about several tens percent. Therefore, in order to effectively utilize a light flux exiting from the image forming lens 3, it is necessary that a micro lens for light collection be provided at each light-receiving part so as to deflect, toward the light-receiving part, light which is about to reach a portion other than the light-receiving part.

Figure 8:
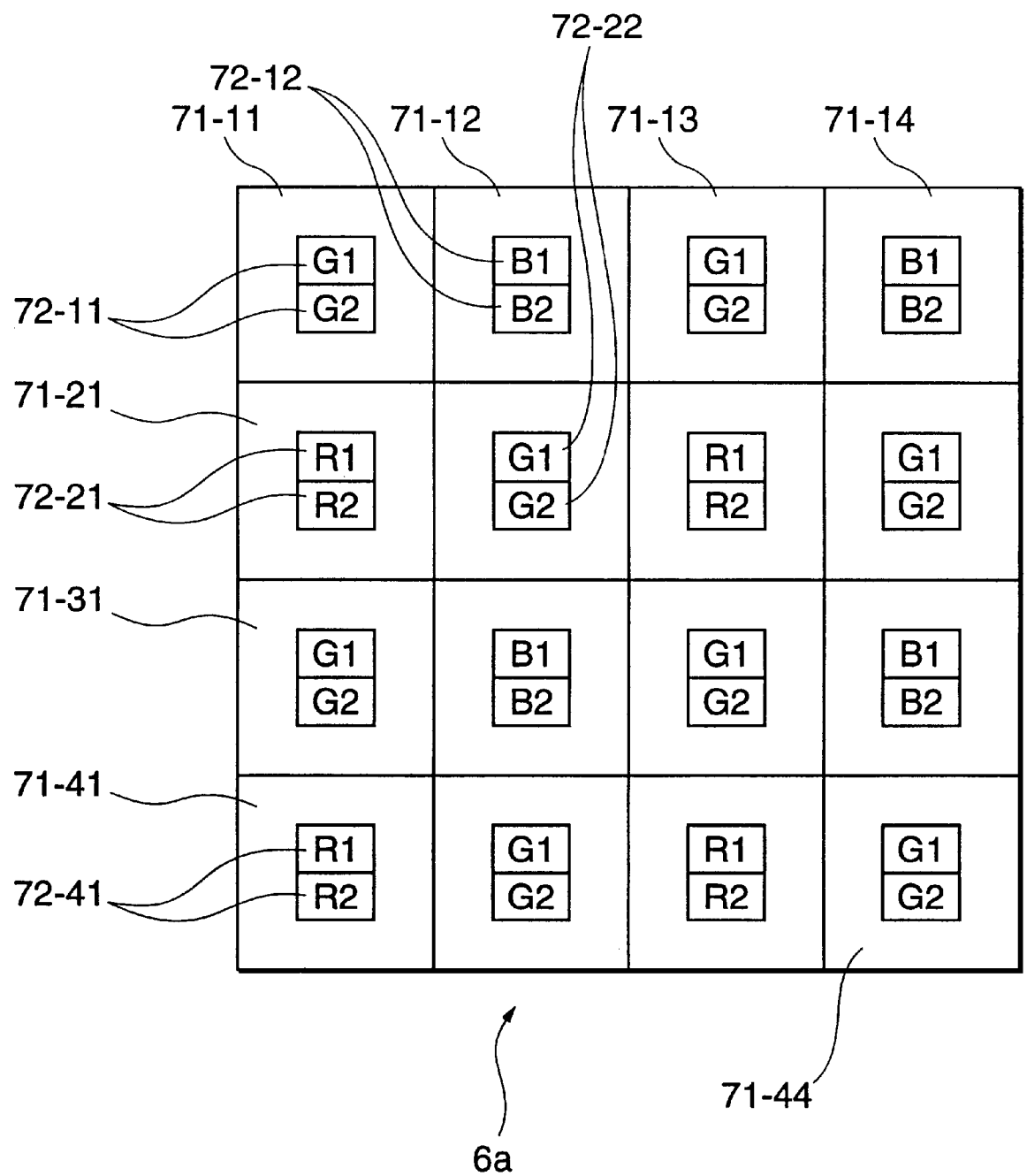
FIG. 8 is a plan view showing the positionally relationship between a micro lens and the light-receiving part in the embodiment of the invention.

FIG. 8 is a plan view showing the positionally relationship between the micro lens, which is disposed in front of the solid-state image sensor, and the light-receiving part.

In FIG. 8, the light-receiving parts 330-21, 330-22, 330-11 and 330-12 are illustrated as light-receiving parts 72-11, 72-21, 72-12 and 72-22. Each of the micro lenses 71-11 to 71-44 is a spherical lens or an aspheric lens of the axis-symmetry type in which an optical axis thereof approximately coincides with the center of the light-receiving part, and has an effective portion of square shape. The light-receiving parts 72-11, 72-21, 72-12 and 72-22 are arranged densely in a grating manner with a convex shape thereof facing the light-entrance side.

As mentioned in the foregoing, one pixel is provided with two photoelectric transducing parts. In FIG. 8, "R", "G" and "B" denote photoelectric transducing parts having red, green and blue color filters, respectively, and "1" and "2" following "R", "G" and "B" denote the first photoelectric transducing part and the second transducing part, respectively. For example, "R1" denotes the first photoelectric transducing part having a red color filter, and "G2" denotes the second photoelectric transducing part having a green color filter. Since one pixels is provided with only two photoelectric transducing parts, i.e., the first photoelectric transducing part and the second transducing part, the high-degree minimization of elements of the solid-state image sensor is unnecessary, so that the solid-state image sensor can be supplied at low cost for digital cameras.

In the area sensor part 6*a*, R (red), G (green) and B (blue) color filters are alternately arranged on the respective pixels, so that the so-called Bayer arrangement in which four pixels are made one set is formed. In the Bayer arrangement, the number of pixels for G (green), which the observer is strongly sensitive to when viewing an image, is larger than the number of pixels for R (red) or B (blue), thereby heightening the total image forming function. In general, in the case of the image sensor of such a type, a luminance signal is formed from G, and color-difference signals are formed from R, G and B.

Next, the function of the micro lens is described.

The micro lens is an element required for performing the first focus detecting process for detecting a phase difference of an image.

Figure 9:
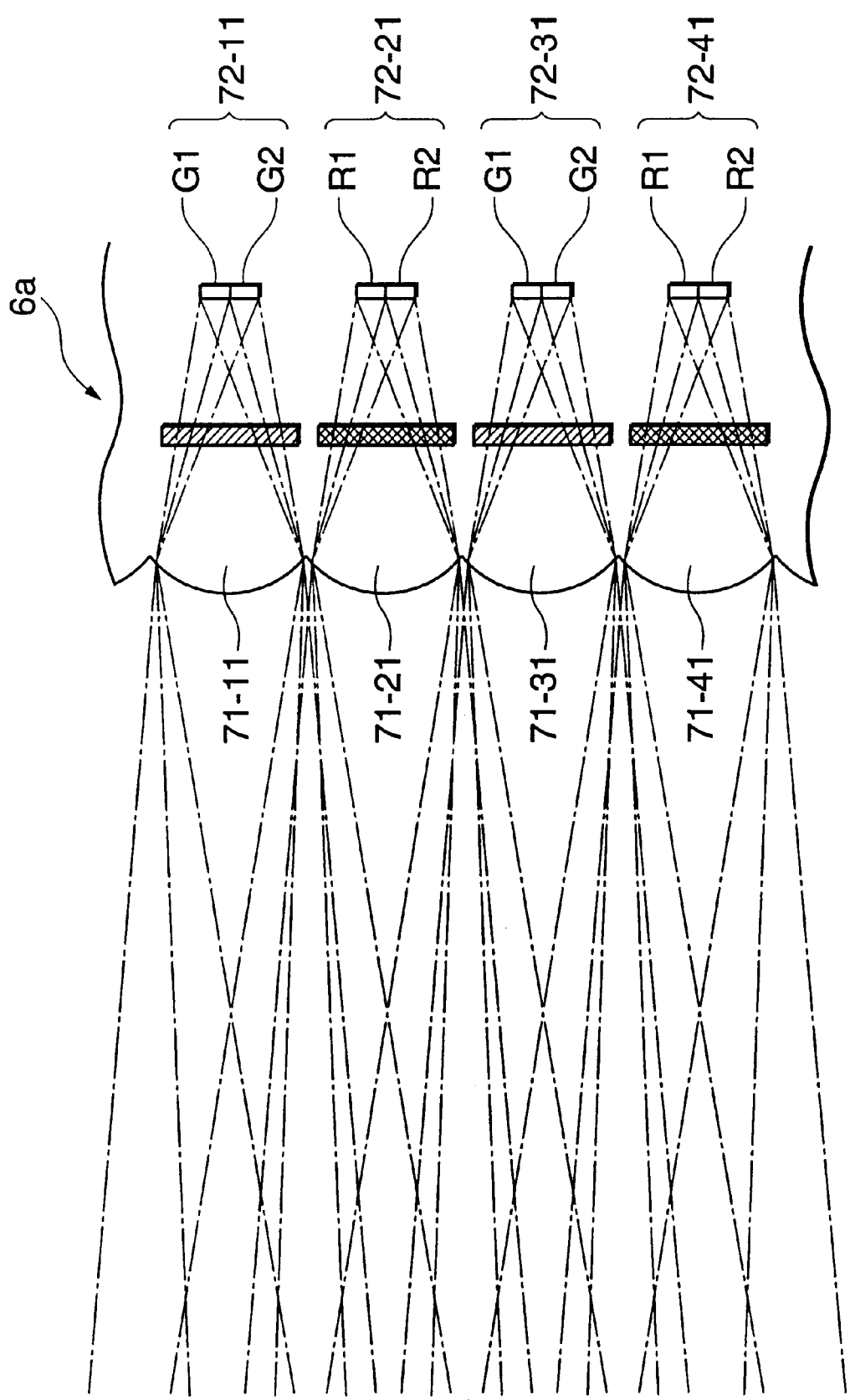
FIG. 9 is a sectional view showing the area sensor part shown in the embodiment of the invention.

FIG. 9 is a sectional view of the area sensor part 6*a*. The above-mentioned image forming lens 3 is located on the left-hand side of FIG. 9. Light fluxes exiting from the image forming lens 3 pass through the optical low-pass filter 4, and then enter the micro lenses 71-11, 71-21, 71-31 and 71-41. At the color filters, which are disposed behind the micro lenses, components of desired wavelength ranges only are selected and are made to reach the light-receiving parts 72-11 to 72-41. The color filters, which constitute the Bayer arrangement as mentioned in the forgoing with reference to FIG. 8, are composed of three kinds of color filters, i.e., R, G and B. Incidentally, because of the Bayer arrangement, only two kinds of color filters, in this case, green-transmitting color filters and red-transmitting color filters, appear on the sectional view in FIG. 9.

The power of each micro lens is set in such a way as to project each light-receiving part of the solid-state image sensor 6 onto an exit pupil of the image forming lens 3. In this instance, it is necessary that a photographic magnification is set in such a way as to make the projected image of each light-receiving part larger than the exit pupil at the time of the full aperture of the image forming lens 3, and the relationship between the amount of light entering each light-receiving part and the area of opening of the stop ST of the image forming lens 3 is approximately linear.

Considering the area sensor part 6*a* of the solid-state image sensor 6 as a whole, irrespective of the individual portions on the area sensor part 6*a*, a light flux entering the second photoelectric transducing part is made to pass through the upper half of the exit pupil of the image forming lens 3 by the action of each micro lens. On the other hand, a light flux entering the first photoelectric transducing part in the whole solid-state image sensor can be considered a light flux obtained by inverting upside down the light flux with the optical axis L1 of the image forming lens 3 taken as an axis of symmetry.

In the optical system described above, for example, when an object image is formed in front of the solid-state image sensor 6, a half light flux passing through the upper portion of the exit pupil shifts downward on the solid-state image sensor 6 as viewed in FIG. 9, and a half light flux passing through the lower portion of the exit pupil shifts upward. In other words, a pair of image signals formed with light fluxes passing through the respective halves of the pupil of the image forming lens 3 indicate the relative positionally change in the vertical direction, as viewed in FIG. 9, according to the image forming state of the object image. The first focus detecting process is a process utilizing such a principle. If a focus detecting point is set on the area sensor part 6*a* and the relative positionally relationship between a pair of image signals obtained around the focus detecting point is detected, an image forming state of the image forming lens 3 at the position of the focus detecting point can be found.

With the above construction employed, it is possible to locate a focus detecting point by the first focus detecting process in any place of the photographic image plane. Further, if the focus detecting area is formed in a rectangular shape the longitudinal direction of which is parallel with the arrangement of divided portions of the pupil of the image pickup optical system, image signals which are long and continuous are used to detect the amount of change of the relative position, so that it is possible to enhance the accuracy of the detection.

On the other hand, in the case of the second focus detecting process, which is of the contrast detection method, a focus detecting output can be obtained from the output of the first photoelectric transducing part, or from the second photoelectric transducing part, or from the an output obtained by adding together the outputs of the first photoelectric transducing part and the second photoelectric transducing part. In order to detect the sharpness of an image, it is preferred that, with attention paid to pixels having green-transmitting color filters, absolute values of differences of outputs of adjacent pixels are added together to obtain an evaluation value, and a maximum value thereof is found from the change of the evaluation value associated with the driving of the focusing lens. With such a process employed, a focus detecting point can be located in any place of the photographic image plane, as in the first focus detecting process.

If the first focus detecting process is performed with respect to the luminance distribution in the vertical direction and the second focus detecting process is performed with respect to the luminance distribution at least in the horizontal direction, the respective directions of the luminance distributions to which the first focus detecting process and the second focus detecting process have sensitivity are orthogonal to each other. Accordingly, if a focus detecting area in the first focus detecting process and a focus detecting area in the second focus detecting process are combined, it is possible to obtain a focus detecting point with which any of the vertical and horizontal luminance distributions can be detected. In addition, the focus detecting point can be located in any place of the photographic image plane.

Figure 10:
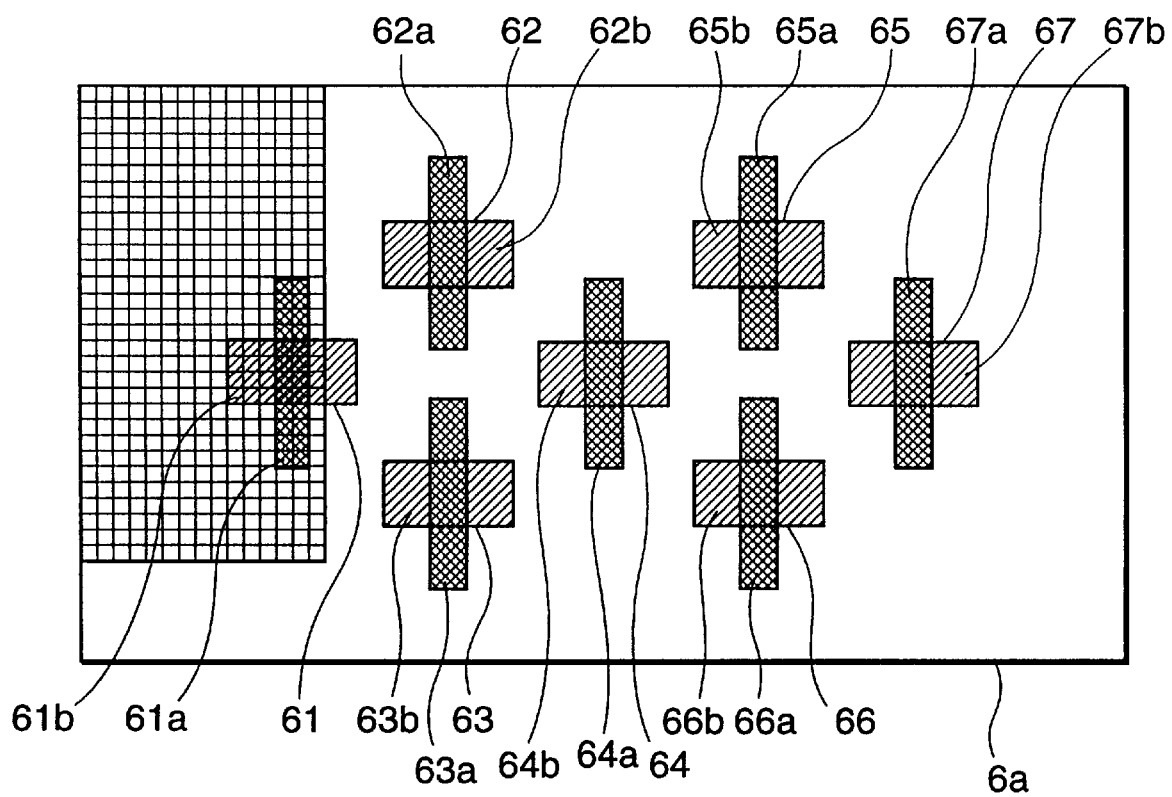
FIG. 10 is a diagram for explaining an image pickup area and focus detecting areas in the embodiment of the invention.

Further, in order to obtain focus detecting image signals for the first focus detecting process and the second focus detecting process with ease, an output position designating command is prepared as one of commands of the solid-state image sensor driving circuit 37. If such an arrangement as to designate, with the command, any one of or any combination of the focus detecting points 61 to 67 shown in FIG. 10 is employed, it is possible to obtain a good operability. Further, in place of the arrangement for selecting one of predetermined focus detecting points, an arrangement for arbitrarily designating a focus detecting point with a pointing device, such as a track ball, may be employed. Each of the focus detecting points 61 to 67 is composed of two areas. Thus, the focus detecting areas 61a, 62a, 63a, 64a, 65a, 66a and 67a are used for the first focus detecting process, and the focus detecting areas 61b, 62b, 63b, 64b, 65b, 66b and 67b are used for the second focus detecting process.

While, in the case of an image sensor of the CCD type, the electric-charge storing periods of all the pixels are the same, the solid-state image sensor 6 is able to easily have such a construction as to perform a reading-out operation in units of pixels, or in units of lines, or in units of blocks, taking advantage of the characteristic of the CMOS sensor. Further, in the solid-state image sensor 6, the beginning and end of the electric-charge storing period can be varied in every unit. In order to obtain an appropriate signal level within each focus detecting area, an electronic shutter is set individually for every focus detecting area, and a line including a designated specific area is set for focus detection to output an image the electric-charge storing level of which has been optimized.

The electric-charge storing action of the solid-state image sensor 6 is described with reference to FIGS. 6 and 7.

First, during the storing action, the FD part 321 is fixed to the power source $V_{DD}$ by setting a control pulse $\phi R_0$ high for the purpose of preventing blooming. When photon hv falls on the solid-state image sensor 6, electron is stored in the pn photodiodes 301 and 351, and positive hole is discharged through the P-type well 317.

Between the pn photodiode (photoelectric transducing part) 301 and the FD part 321, there is formed energy barrier by the transfer MOS transistor 303, and between the pn photodiode (photoelectric transducing part) 351 and the FD part 321, there is formed energy barrier by the transfer MOS transistor 353. For this reason, during the photoelectric charge storing action, photon exists in the photodiodes 301 and 351. After that, the horizontal scanning part 316 is made to perform a scanning action for the similar electric-charge storing action, so that electric charge is stored in all the photoelectric transducing parts.

When a reading-out state is brought about, control pulses $\phi TX_{00}$ and $\phi TX_{e0}$ are set, in accordance with one of a first output mode and a second output mode, in such a way as to remove energy barrier by the transfer MOS transistors 303 and 353 and to completely transfer electron in the pn photodiodes 301 and 351 to the FD part 321.

The reading-out action for an image in the second output mode is performed as follows.

First, the control pulse $\phi R_0$ is set to the high level to reset the FD part 321 to the power source $V_{DD}$, and the control pulse $\phi S_0$ is set to the high level to store a dark output in the storing capacitance 310. Next, the control pulse $\phi TX_{00}$ is set to the high level to transfer photoelectric charge stored in the pn photodiode 301 to the storing capacitance 311 through the source follower MOS transistor 305 and the selection switch MOS transistor 306. Then, with a noise component canceled by the differential amplifier 314, a first image signal $V_{OUT}$ is outputted from the first photoelectric transducing part.

Further, the control pulse $\phi R_0$ is set to the high level to reset the FD part 321 to the power source $V_{DD}$. Next, the control pulse $\phi TX_{00}$ is set to the high level to transfer photoelectric charge stored in the pn photodiode 351 to the storing capacitance 311 through the source follower MOS transistor 305 and the selection switch MOS transistor 306. Then, with a noise component canceled by the differential amplifier 314, a second image signal $V_{OUT}$ is outputted from the second photoelectric transducing part.

On the other hand, when an image signal is read out in the first output mode, the control pulses $\phi TX_{00}$ and $\phi TX_{e0}$ are set in such a way as to simultaneously remove energy barrier by the transfer MOS transistors 303 and 353 and to completely transfer electron in the two pn photodiodes 301 and 351 to the FD part 321. Thus, it is possible to read out an image signal obtained by adding together electric charge of the first photoelectric transducing part and electric charge of the second photoelectric transducing part.

Now, the signal processing for focus detection is described.

The focus detecting process, as mentioned in the foregoing, is composed of the first focus detecting process and the second focus detecting process so as to cause a focus detecting point to have sensitivity both in the contrast distribution in the vertical direction and the contrast distribution in the horizontal direction. A focus detecting area for the first focus detecting process and a focus detecting area for the second focus detecting process are areas of the rectangular form which are orthogonal to each other.

First, the first focus detecting process is performed using a first computing means for detecting a change of the relative position between a first photoelectric transducing output (first image signal) obtained with a light flux passing through a divided portion of the exit pupil of the image forming lens 3 and a second photoelectric transducing output (second image signal) obtained with a light flux passing through another divided portion of the exit pupil of the image forming lens 3.

Figure 11:
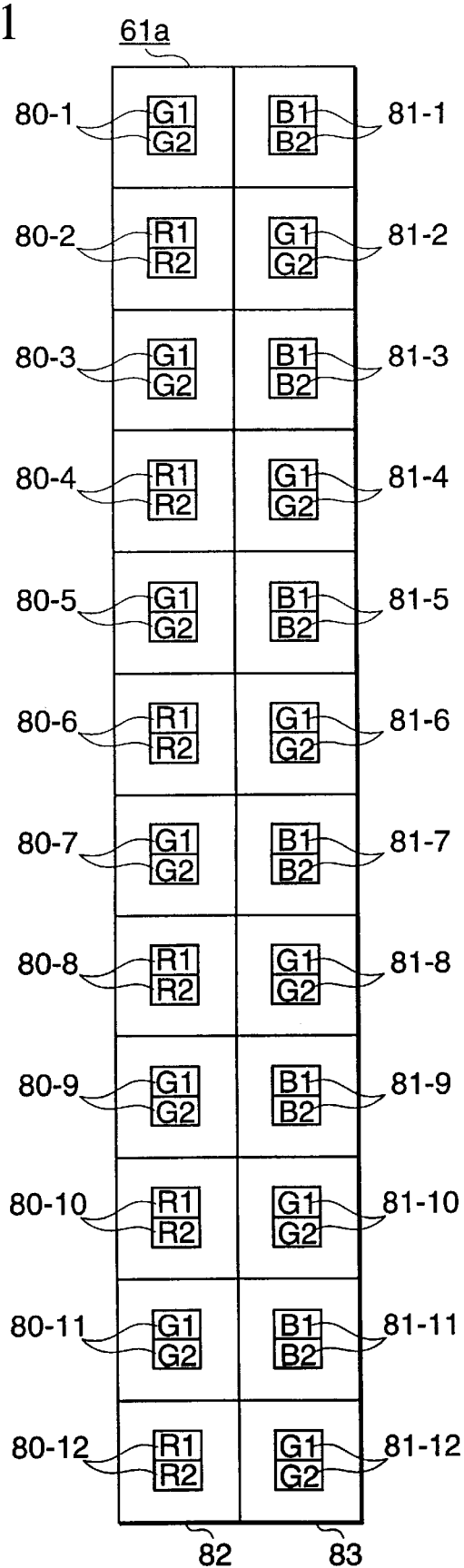
FIG. 11 is an enlarged view of a focus detecting area 61*a* shown in FIG. 10.

FIG. 11 is an enlarged view of the focus detecting area 61a, for use in the first focus detecting process, of the focus detecting point 61. The other focus detecting areas 62a, 63a, 64a, 65a, 66a and 67a have the same construction as that of the focus detecting area 61a. FIGS. 12 to 19 are diagrams showing digital signals supplied to the visual-line detection and AF control circuit 40.

The image signals for focus detection in the first focus detecting process are obtained by photoelectrically transducing, substantially at the same timing, a pair of object images formed in the second output mode and separately outputting the first image signal from the first photoelectric transducing part and the second image signal from the second photoelectric transducing part independently of each other.

As shown in FIG. 11, the focus detecting area 61a is provided with two pixel arrays each of which is composed of twelve light-receiving parts. The pixel array 82 is composed of light-receiving parts 80-1, 80-2, ..., 80-12, and the pixel array 83 is composed of light-receiving parts 81-1, 81-2, ..., 81-12. Since the color filters of the area sensor part 6a are formed in the Bayer arrangement, two kinds of color filters are alternately arranged in each pixel array. Accordingly, for the purpose of focus detection, each pixel array is divided into two kinds of light-receiving parts according to the kinds of color filters, and, from each of the two kinds of light-receiving parts, there are formed a pair of image signals composed of the signal from the first photoelectric transducing part and the signal from the second photoelectric transducing part. Thus, four pairs of image signals in total are obtained from the focus detecting area 61a. Incidentally, as mentioned in the foregoing, the storing period in one focus detecting area is made substantially uniform.

FIGS. 12 to 15 show the above-mentioned four pairs of image signals.

Figure 12:
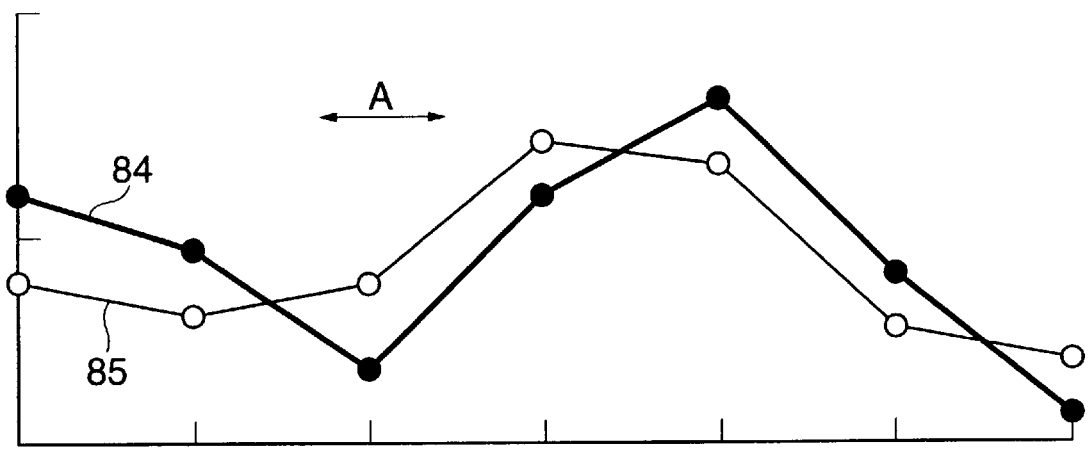
FIG. 12 is a diagram showing image signals obtained by light-receiving parts 80-1, 80-3, . . . , 80-11, each having a green color filter provided thereon, of a pixel array 82 shown in FIG. 11.

FIG. 12 is a diagram showing image signals obtained by the light-receiving parts 80-1, 80-3, ..., 80-11, each having a green color filter provided thereon, of the pixel array 82. In FIG. 12, reference numeral 84 denotes the first image signal obtained by the first photoelectric transducing part indicated by G1, and reference numeral 85 denotes the second image signal obtained by the second photoelectric transducing part indicated by G2.

Figure 13:
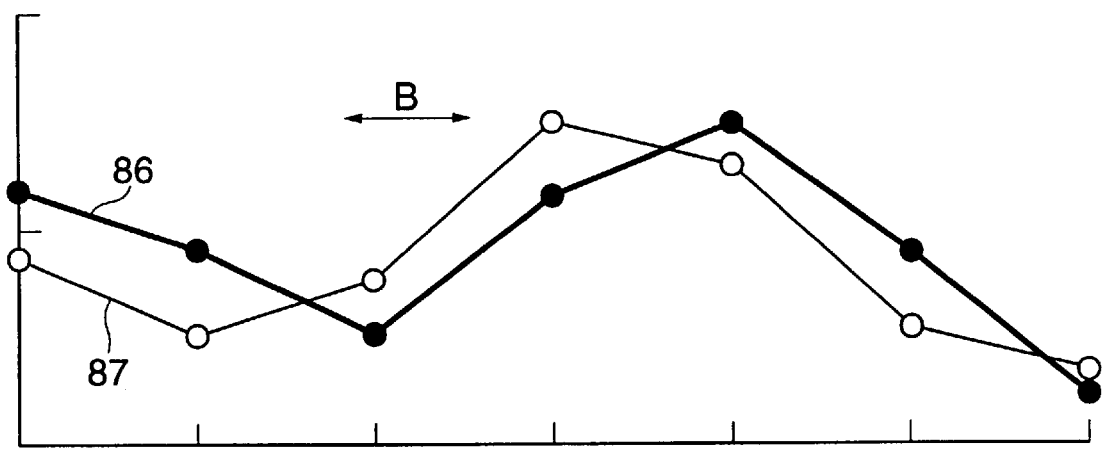
FIG. 13 is a diagram showing image signals obtained by light-receiving parts 81-2, 81-4, . . . , 81-12, each having a green color filter provided thereon, of a pixel array 83 shown in FIG. 11.

FIG. 13 is a diagram showing image signals obtained by the light-receiving parts 81-2, 81-4, ..., 81-12, each having a green color filter provided thereon, of the pixel array 83. In FIG. 13, reference numeral 86 denotes the first image signal obtained by the first photoelectric transducing part indicated by G1, and reference numeral 87 denotes the second image signal obtained by the second photoelectric transducing part indicated by G2.

Figure 14:
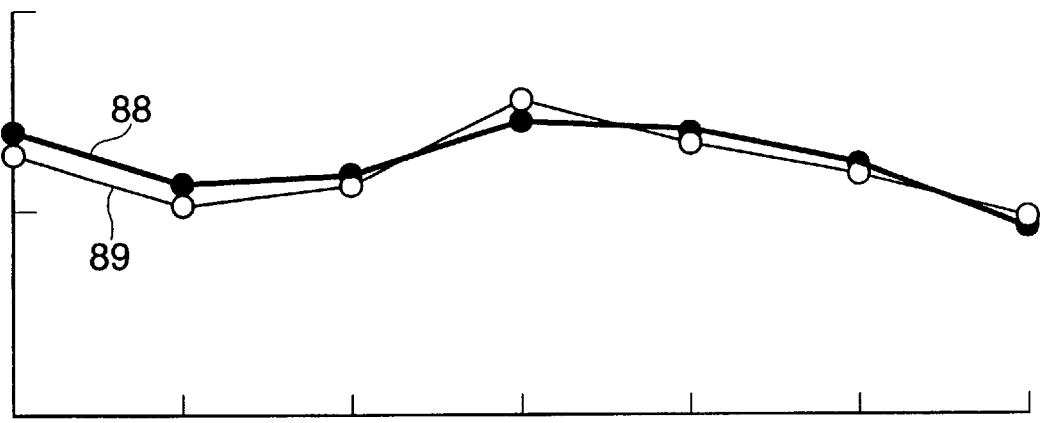
FIG. 14 is a diagram showing image signals obtained by light-receiving parts 80-2, 80-4, . . . , 80-12, each having a red color filter provided thereon, of the pixel array 82 shown in FIG. 11.

FIG. 14 is a diagram showing image signals obtained by the light-receiving parts 80-2, 80-4, ..., 80-12, each having a red color filter provided thereon, of the pixel array 82. In FIG. 14, reference numeral 88 denotes the first image signal obtained by the first photoelectric transducing part indicated by R1, and reference numeral 89 denotes the second image signal obtained by the second photoelectric transducing part indicated by R2.

Figure 15:
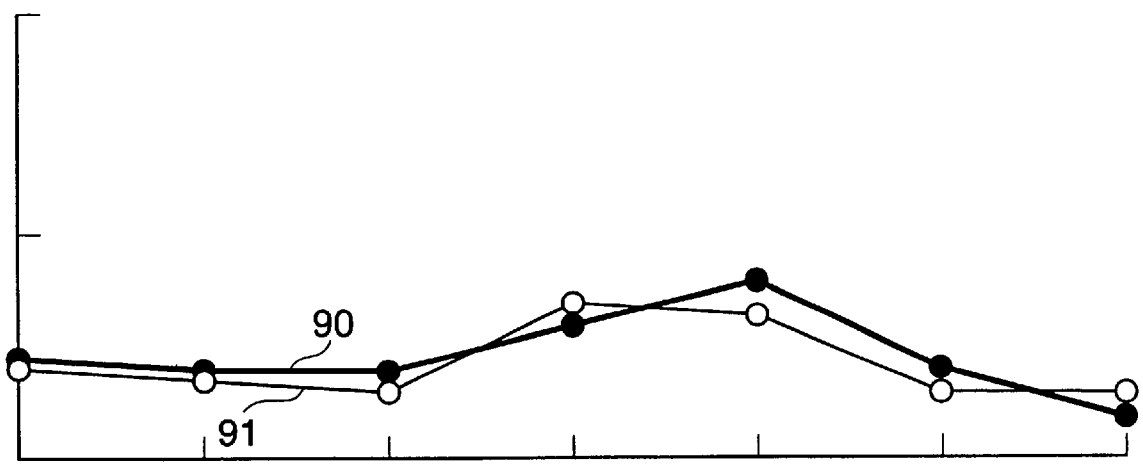
FIG. 15 is a diagram showing image signals obtained by light-receiving parts 81-1, 81-3, . . . , 81-11, each having a blue color filter provided thereon, of the pixel array 83 shown in FIG. 11.

FIG. 15 is a diagram showing image signals obtained by the light-receiving parts 81-1, 81-3, ..., 81-11, each having a blue color filter provided thereon, of the pixel array 83. In FIG. 15, reference numeral 90 denotes the first image signal obtained by the first photoelectric transducing part indicated by B1, and reference numeral 91 denotes the second image signal obtained by the second photoelectric transducing part indicated by B2.

These are image signals obtained in a case where an object image formed on the focus detecting area 61a by the image pickup optical system 24 indicates light and shade in orange and yellow. The graphs of FIGS. 12 and 13 indicate that the contrast in green is high, the graph of FIG. 14 indicates that, while the contrast in red is low, the intensity in red is high, and the graph of FIG. 15 indicates that both the contrast and intensity in blue are low. FIGS. 12 to 15 each show the situation in which the object image is in a defocused state. Thus, as indicated by arrows A and B in FIGS. 12 and 13, the first image signal obtained by the first photoelectric transducing part and the second image signal obtained by the second photoelectric transducing part are shifted in position relative to each other. On the basis of the degree of such shifting, the amount of defocus can be found. Accordingly, the above-mentioned method is called the phase-difference detection method.

Further, FIGS. 16 to 19 each show the situation in which the object image is in an in-focus state, and illustrate the manner in which the signal shown in each of FIGS. 12 to 15 varies according to the movement of the image forming lens 3.

Figure 16:
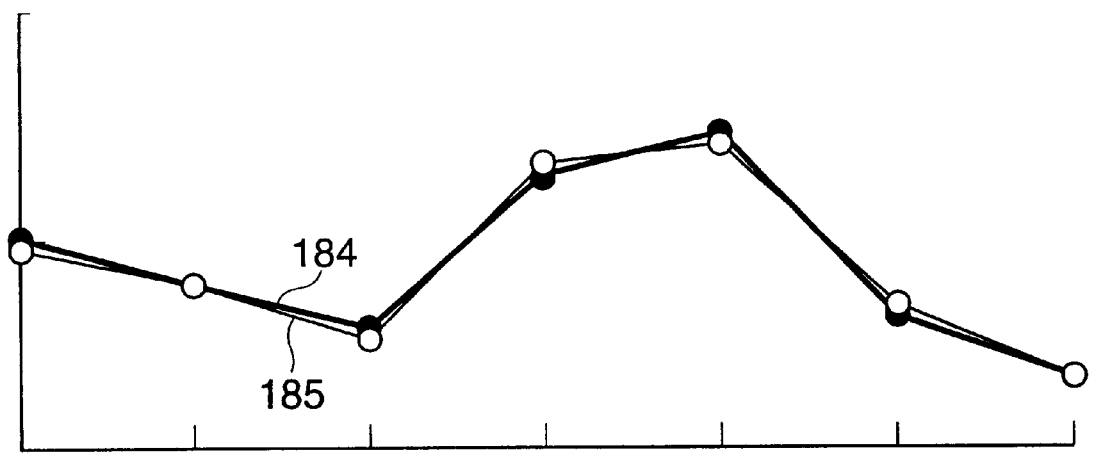
FIG. 16 is a diagram showing image signals obtained by the light-receiving parts 80-1, 80-3, . . . , 80-11, each having a green color filter provided thereon, of the pixel array 82 shown in FIG. 11.

FIG. 16 is a diagram showing image signals obtained by the light-receiving parts 80-1, 80-3, ..., 80-11, each having a green color filter provided thereon, of the pixel array 82. In FIG. 16, reference numeral 184 denotes the first image signal obtained by the first photoelectric transducing part indicated by G1, and reference numeral 185 denotes the second image signal obtained by the second photoelectric transducing part indicated by G2.

Figure 17:
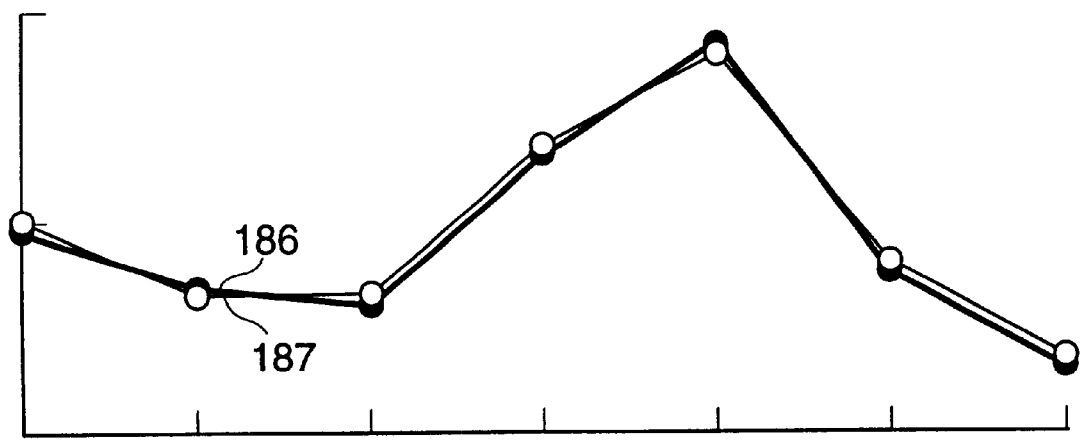
FIG. 17 is a diagram showing image signals obtained by the light-receiving parts 81-2, 81-4, . . . , 81-12, each having a green color filter provided thereon, of the pixel array 83 shown in FIG. 11.

FIG. 17 is a diagram showing image signals obtained by the light-receiving parts 81-2, 81-4, ..., 81-12, each having a green color filter provided thereon, of the pixel array 83. In FIG. 17, reference numeral 186 denotes the first image signal obtained by the first photoelectric transducing part indicated by G1, and reference numeral 187 denotes the second image signal obtained by the second photoelectric transducing part indicated by G2.

Figure 18:
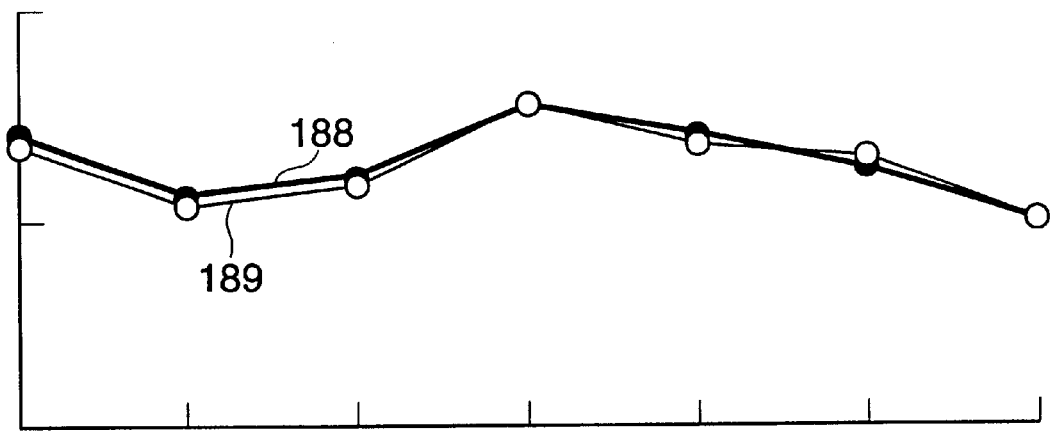
FIG. 18 is a diagram showing image signals obtained by the light-receiving parts 80-2, 80-4, . . . , 80-12, each having a red color filter provided thereon, of the pixel array 82 shown in FIG. 11.

FIG. 18 is a diagram showing image signals obtained by the light-receiving parts 80-2, 80-4, ..., 80-12, each having a red color filter provided thereon, of the pixel array 82. In FIG. 18 reference numeral 188 denotes the first image signal obtained by the first photoelectric transducing part indicated by R1, and reference numeral 189 denotes the second image signal obtained by the second photoelectric transducing part indicated by R2.

Figure 19:
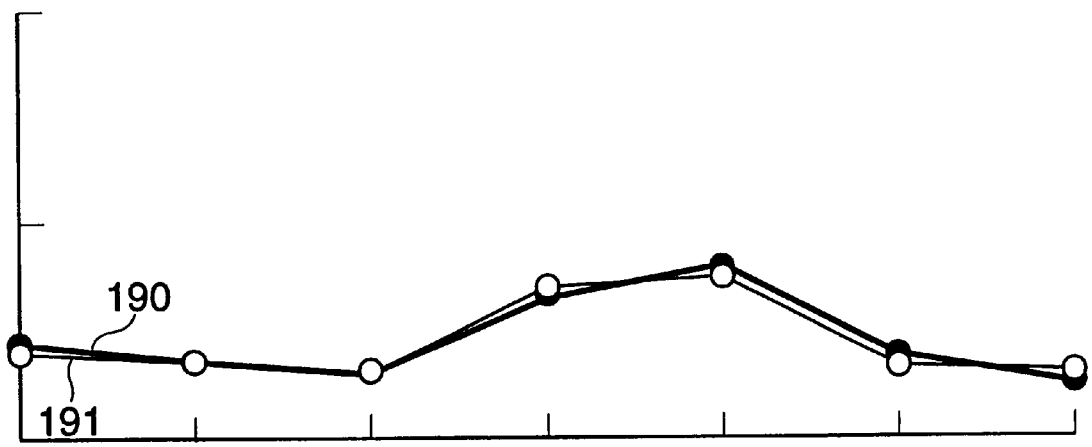
FIG. 19 is a diagram showing image signals obtained by the light-receiving parts 81-1, 81-3, . . . , 81-11, each having a blue color filter provided thereon, of the pixel array 83 shown in FIG. 11.

FIG. 19 is a diagram showing image signals obtained by the light-receiving parts 81-1, 81-3, ..., 81-11, each having a blue color filter provided thereon, of the pixel array 83. In FIG. 19, reference numeral 190 denotes the first image signal obtained by the first photoelectric transducing part indicated by B1, and reference numeral 191 denotes the second image signal obtained by the second photoelectric transducing part indicated by B2.

When the object image is in an in-focus state, the first image signal obtained by the first photoelectric transducing part and the second image signal obtained by the second photoelectric transducing part coincide in phase with each other. Accordingly, by detecting the similarity of such a pair of signals, a focusing state can be detected. Further, by detecting the amount of change of the relative position of the pair of signals by using a known method using a correlation computing operation, for example, the method disclosed in Japanese Patent Publication No. Hei 5-88445, the amount of defocus can be obtained. If the this-obtained amount of defocus is converted into the amount of driving of the focusing lens of the image forming optical system 24, it becomes possible to perform an automatic focus adjusting operation. In this instance, since the amount of driving of the focusing lens can be found beforehand, in general, almost one driving would suffice for the focusing lens to reach an in-focus position, so that it is possible to realize an extremely high-speed focus adjusting operation.

Incidentally, here, the color-separated signals are used for focus detection. If no color separation is performed, because a signal to be used for focus detection corresponds to a signal obtained by adding together the color-separated signals, the contrast of the object image tends to become low, so that focus detection tends to become impossible. On the other hand, if the color-separated signals are used for focus detection, although the high contrast does not necessarily appear with respect to all the R, G and B signals, as mentioned above, a high-contrast signal can be obtained, on the contrary, with respect to any one of the R, G and B signals, so that, in most cases, focus detection becomes possible.

In addition, while an object image passing through the optical low-pass filter LPF falls on the solid-state image sensor 6, some of high-frequency components exceeding the Nyquist frequency "vn=1/(2×2P)" of the focus detecting system are picked up by the solid-state image sensor 6 due to the characteristic of the optical system. Accordingly, there is a possibility that, depending on the pattern of an object, the phase of an object image is not reflected in the phase of image signals, and some errors are included in the result of focus detection.

In a case where there is no phase difference between image signals, the phase errors are included uniformly in a pair of signals. Accordingly, even if the above-mentioned phenomenon occurs, there appear no focus detecting errors. In other words, while no errors occur for focus detection in the signals shown in FIGS. 16 and 17, an error occurs for detecting the amount of defocus in the signals shown in FIGS. 12 and 13.

As understood from FIGS. 12 and 13, the sampling positions of the object image in the signals 86 and 87 are shifted by a half pitch with respect to those in the signals 84 and 85. Therefore, the result of focus detection computed from the signals 84 and 85 and the result of focus detection computed from the signals 86 and 87 are averaged to obtain a final result of focus detection, so that it is possible to reduce focus detecting errors, thereby solving the above-mentioned inconveniences.

Similarly, the sampling positions of the object image in the signals 90 and 91 are shifted by a half pitch with respect to those in the signals 88 and 89. Therefore, the result of focus detection computed from the signals 88 and 89 and the result of focus detection computed from the signals 90 and 91 are averaged to obtain a final result of focus detection, so that it is possible to reduce focus detecting errors. In this case, results of focus detection obtained with attention paid to red and blue are averaged. As a result, chromatic aberrations of the image pickup optical system 24 are also averaged, advantageously.

In addition, if, among the result of focus detection computed from the signals 84 and 85, the result of focus detection computed from the signals 86 and 87, the result of focus detection computed from the signals 88 and 89 and the result of focus detection computed from the signals 90 and 91, only ones having high reliability are selected and averaged, it is possible to obtain the higher accuracy of focus detection. For example, the results of focus detection in such low-contrast signals as shown in FIG. 14 or 15 are made not to be used for focus adjustment.

The foregoing description has been made on the premise that the first image signal obtained by the first photoelectric transducing part and the first image signal obtained by the first photoelectric transducing part are in such a relationship as to be shifted in position relative to each other. This premise exists in the case where the amount of defocus is relatively small.

Next, the method of coping with a large defocus is described.

In the image pickup apparatus shown in FIG. 1, the stop ST is provided with five openings which are denoted by reference numerals 204 to 208. The openings 204, 205 and 206 are ones for use in picking up an image, and the openings 207 and 208 are ones for use in detecting the large defocus. During an image pickup operation, one of the openings 204, 205 and 206 is automatically selected in accordance with the luminance of an object to be photographed. Alternatively, this arrangement may be changed such that one of the openings 204, 205 and 206 is arbitrarily selected by the user. The selection of the opening smaller in size, i.e., the selection of the opening 205 rather than the opening 204, or the selection of the opening 206 rather than the opening 205, makes an in-focus range in the filed of view deeper and makes an electronic charge storing time of the electronic shutter longer.

Each micro lens disposed on the solid-state image sensor 6 is arranged to project each light-receiving part of the solid-state image sensor 6 onto an exit pupil of the image pickup optical system 24. In order to make the relationship between the amount of light entering each light-receiving part of the solid-state image sensor and the area of opening of the stop ST linear, the power of each micro lens is set in such a way as to make the projected image of each light-receiving part larger than the exit pupil at the time of the full aperture of the image pickup optical system 24. Thus, when comparing, on the stop ST, the projected image of each light-receiving part with the opening, the projected image of each light-receiving part is larger than the largest opening 204. With this arrangement adopted, the amount of light entering the solid-state image sensor 6 is made approximately proportional to the area of opening of the stop ST. Accordingly, when the object luminance and the sensitivity of the solid-state image sensor 6 are determined, it is possible to compute an aperture value and a shutter speed with the same method as that in an ordinary film camera. In other words, since the amount of entering light is proportional to the area of opening of the stop, a computing operation of the APEX method can be realized.

Even when any one of the openings 204, 205 and 206 is used to pick up an image, the image is formed with a half light flux which has passed through a semicircular area obtained by dividing the exit pupil into two parts. In general, an object image is determined by the convolution of a point image and the luminance distribution of the object. Accordingly, when the amount of defocus of the object image becomes large, the shape of the exit pupil comes to appear in the point image, and, as a result, a blur of the shape obtained by dividing a circle into two parts comes to be superposed on the image.

If a pair of image signals for focus detection are formed with light fluxes passing through a pair of exit pupils having such shapes as to be able to coincide with each other by moving in parallel, the first image signal obtained by the first photoelectric transducing part and the second image signal obtained by the second photoelectric transducing part are in such a relation as to be shifted relative to each other, whatever the individual pupil shape is. However, in a case where any one of the openings 204, 205 and 206 is used, the shapes of areas obtained by dividing the exit pupil are two semicircular shapes which are turned over with respect to each other. Therefore, even if one of the divided areas is moved in parallel, it does not coincide with the other. Accordingly, the shapes of blurs superposed on the image are also brought into a turned-over relation with each other. Thus, the first image signal obtained by the first photoelectric transducing part and the second image signal obtained by the second photoelectric transducing part are brought into such a relation as to be shifted relative to each other while having the respective different shapes. As a result, when the large defocus occurs, the detection of a phase difference of an image does not succeed, so that there is a large error in detecting the amount of defocus.

In addition, as another factor of making an error in detecting the amount of defocus larger, there is a manufacturing error of each micro lens. As mentioned in the foregoing, each micro lens is arranged to project each light-receiving part onto the exit pupil of the image pickup optical system. Supposing such a projected position varies with the respective pixels, the amount of change of the relative position at the time of the large defocus would vary with the respective pixels. Such an influence is more serious accordingly as the amount of defocus becomes larger. However, since the micro lens is very minute, in actuality, a certain degree of manufacturing unevenness has to be allowed in manufacturing the micro lens. Therefore, when the large defocus is to be detected, the openings 207 and 208 of the stop ST, which are arranged to be used for detecting the large defocus, are used. The areas on the exit pupil divided by the openings 207 and 208 are not influenced by the accuracy of projection of the pupil by the micro lens. Accordingly, even if there is a manufacturing error in the micro lens, it is possible to obtain the divided areas on the exit pupil as made definite.

Besides, assuming that each of the openings 207 and 208 is, for example, an ellipse or a circle, since they have the similar shapes which are able to coincide with each other by moving in parallel, the first image signal obtained by the first photoelectric transducing part and the second image signal obtained by the second photoelectric transducing part are brought into such a relation as to be shifted only in phase relative to each other. Accordingly, even if the large defocus occurs, it is possible to limit a detection error in the amount of defocus to a very small value.

Further, if the height of entrance of the center of gravity of each of the openings 207 and 208 is set to 0.7 times or thereabout the full-aperture diameter, it is possible to accurately detect, in levels of aberration, the amount of defocus up to the most resolution in respect of the image pickup optical system having the general spherical aberration characteristic. Incidentally, when the zooming action of the image pickup optical system 24 is performed, although, in general, the full-aperture F-number varies, the relation of the position of the center of gravity of each of the openings 207 and 208 to the full aperture of the stop is kept to a constant ratio. Accordingly, the height of entrance of the center of gravity of each of the openings 207 and 208 advantageously becomes always 0.7 times or thereabout the full-aperture diameter, irrespective of the zooming position.

At the time of a focus adjusting action for the first time, in which the possibility that an object is in an in-focus state is low, the openings 207 and 208 are first used, so that, even if the large defocus is occurring, the focus adjusting action capable of coping with the large defocus and the viewfinder displaying action for observing the image are performed. Then, in focus adjusting actions for the second and subsequent times, any one of the openings 204, 205 and 206 is used to perform the remaining focus adjusting action and the viewfinder displaying action. Subsequently, the image pickup apparatus makes preparation for the sequence of an image pickup operation.

The image pickup apparatus arranged as described above necessitates no dedicated focus adjusting device for detecting the amount of defocus of the image pickup optical system. Therefore, a mirror or a prism for splitting an optical path is not required. Accordingly, it is possible to reduce the size of the image pickup system.

Next, the second focus detecting process is described.

In the second focus detecting process, a second computing means for detecting the contrast of an object image in a direction different from the direction of change of the relative position of the first and second image signals used in the first computing means is used.

Figure 20:
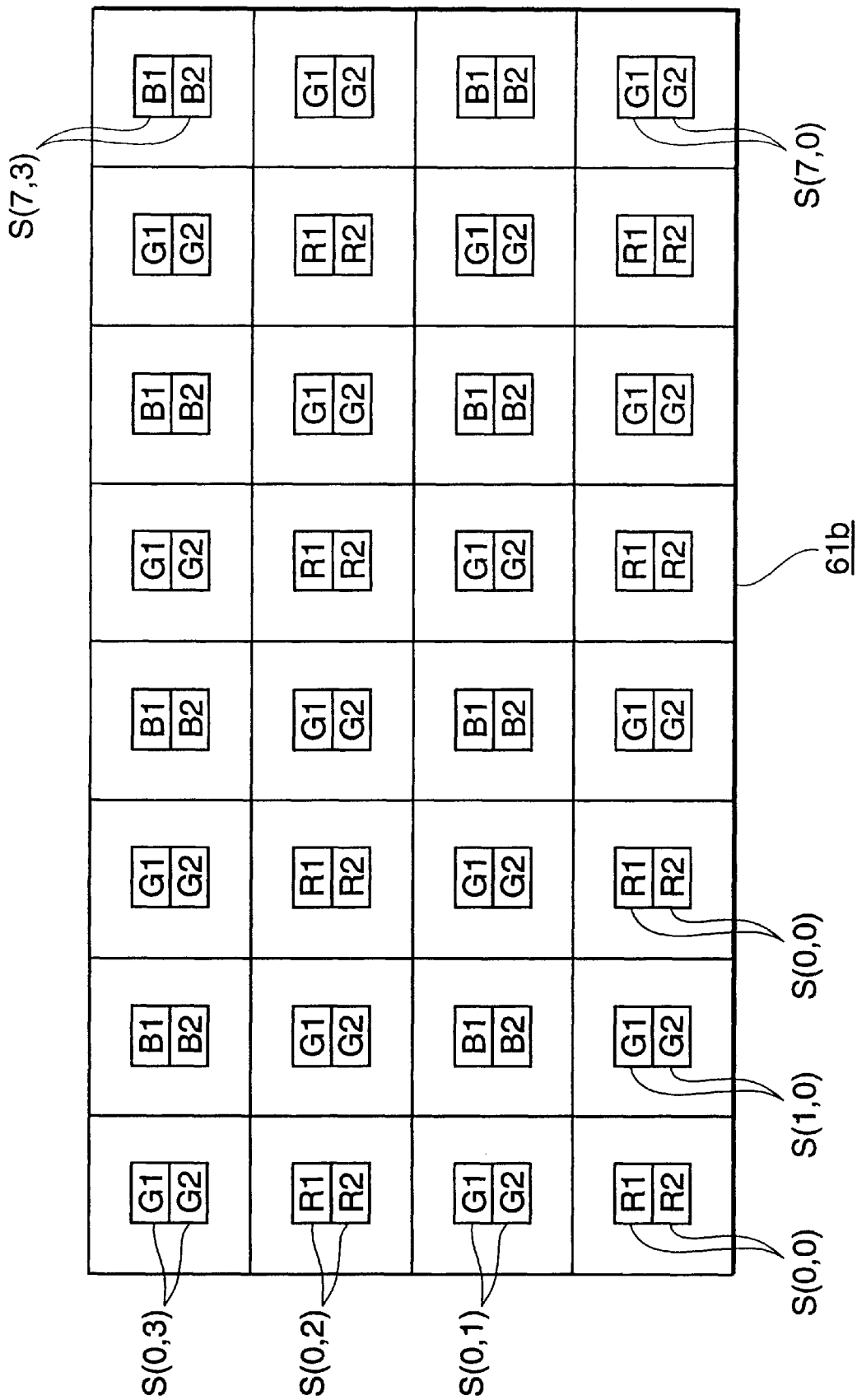
FIG. 20 is an enlarged view of a focus detecting area 61*b*, for use in a second focus detecting process, of a focus detecting point 61 shown in FIG. 10.

FIG. 20 is an enlarged view of the focus detecting area 61b, for use in the second focus detecting process, of the focus detecting point 61 shown in FIG. 10. The other focus detecting areas 62b, 63b, 64b, 65b, 66b and 67b have the same construction as that of the focus detecting area 61b.

The image signal for focus detection in the second focus detecting process is an image signal obtained by photoelectrically transducing, substantially at the same timing, a pair of object images formed in the first output mode and adding together electric charges obtained by the first photoelectric transducing part and the second photoelectric transducing part. Since the image signal for focus detection obtained in the first output mode is formed with a light flux passing through the whole exit pupil of the image forming lens 3, it is possible to detect the most in-focus position with the optical aberration of the image forming lens 3 taken into consideration.

As shown in FIG. 20, the focus detecting area 61b is composed of pixels of "4 rows×8 columns". In FIG. 20, light-receiving parts are represented by arrangement S(m, n), where m and n are zero and natural numbers. Since the color filters on the area sensor part 6a are formed into the Bayer arrangement, the focus detecting area 61b is provided with three kinds of, i.e., R, G and B, color filters. Therefore, for the purpose of focus detection, pixel arrays are classified with the kinds of color filters, and a contrast evaluation value is computed for every color.

More specifically, in light-receiving parts having green color filters provided thereon, $S(1, 0)$, $S(3, 0)$, $S(5, 0)$, $S(7, 0)$, $S(0, 1)$, $S(2, 1)$, $S(4, 1)$, $S(6, 1)$, $S(1, 3)$, $S(3, 3)$, $S(5, 3)$, $S(7, 3)$, $S(0, 3)$, $S(2, 3)$, $S(4, 3)$ and $S(6, 3)$, light-receiving parts having red color filters provided thereon, $S(0, 0)$, $S(2, 0)$, $S(4, 0)$, $S(6, 0)$, $S(0, 3)$, $S(2, 3)$, $S(4, 3)$ and $S(6, 3)$, and light-receiving parts having blue color filters provided thereon, $S(1, 1)$, $S(3, 1)$, $S(5, 1)$, $S(7, 1)$, $S(1, 3)$, $S(3, 3)$, $S(5, 3)$ and $S(7, 3)$, the sums of absolute values of differences of outputs of adjacent pixels are respectively computed, and, then, the sum of the computed sums for R, G and B colors is obtained.

However, the arrangement for obtaining the values of contrast in the horizontal direction of the focus detecting area 61b in respect of R, G and B colors and adding together these values corresponds to the arrangement for obtaining the sum of absolute values of differences of outputs of every other pixel. Therefore, the actual computing formula for the contrast evaluation value C can be expressed simply by the equation (1) shown in FIG. 23.

The first term of the equation (1) shown in FIG. 23 indicates a contrast value obtained when focus detection is performed in the horizontal direction, and the second term thereof indicates a contrast value obtained when focus detection is performed in the vertical direction. Accordingly, in a case where focus detection is to be performed only in the horizontal direction, only the first term of the equation (1) shown in FIG. 23 is used, i.e., the equation (2) shown in FIG. 23 is used.

In addition, while, in the above description, for the purpose of simplicity, one focus detecting area is composed of pixels of "4 rows×8 columns", a greater number of pixels may be used to improve the accuracy of detection for contrast.

After the contrast evaluation value of the object image is computed with the above-described method, the in-focus position is detected by monitoring the contrast evaluation value and finding the peak position thereof while controlling the amount of driving movement of the focusing lens of the image forming lens 3.

Thus, in the second focus detecting process, the contrast of an image is detected with respect to components in a direction different from the direction of change of the relative position of the first and second image signals used in the first focus detecting process, i.e., components in the horizontal direction of the object luminance distribution.

Next, the operation of the camera is described with reference to the flow charts of FIGS. 21 and 22.

Figure 21:
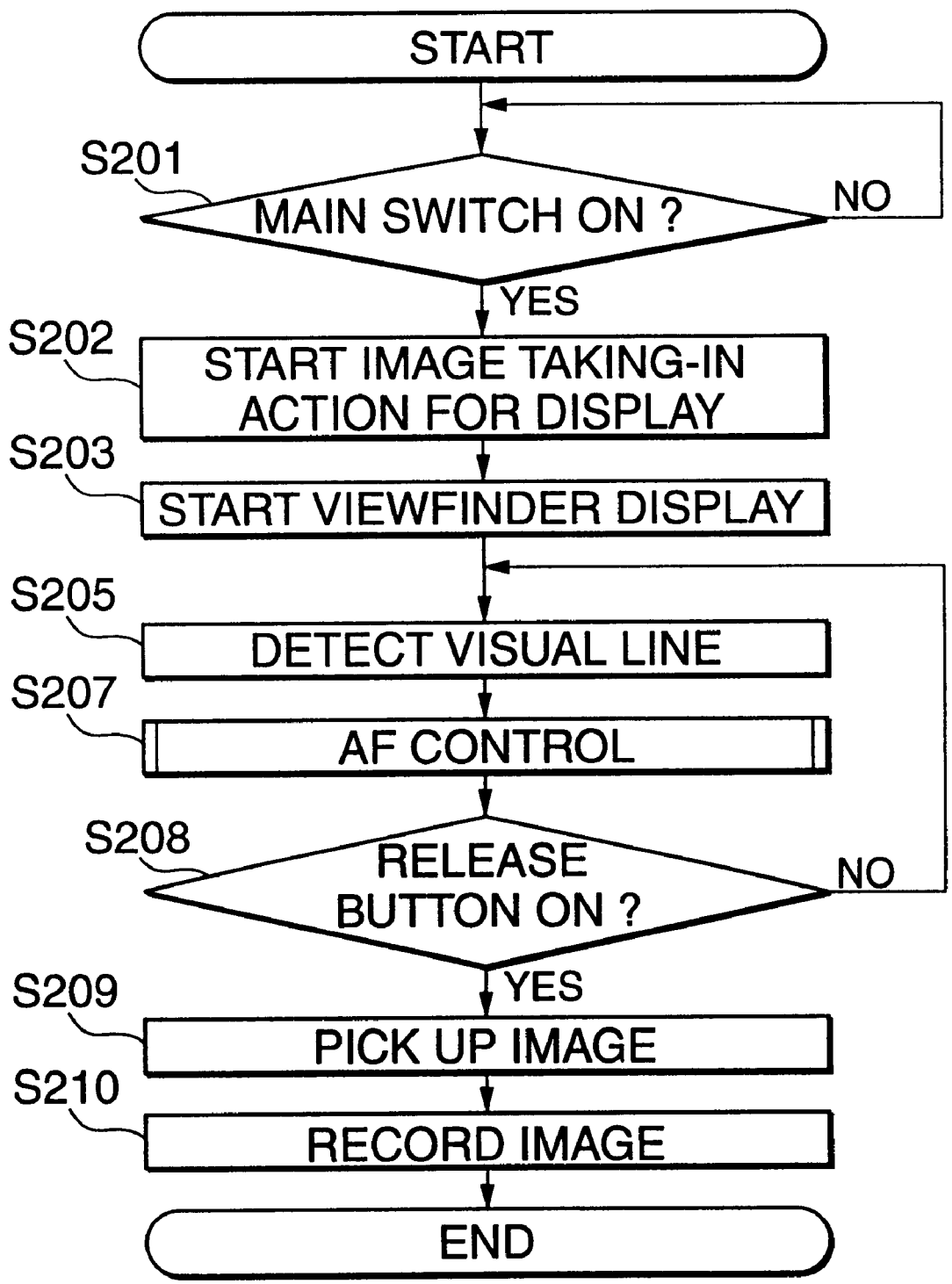
FIG. 21 is a flow chart showing the action of the digital color camera according to the embodiment of the invention.

The flow chart of FIG. 21 represents a control program written in the ROM disposed within the camera system control circuit 35.

Referring to FIG. 21, when the control program starts, first, in step S201, a check is made via the operation detecting circuit 36 to find if the main switch 19 is in the on-state. If the main switch 19 is in the off-state, the procedure repeats the step S201. If the main switch 19 is in the on-state, the procedure proceeds to the next step S202. In the step S202, the solid-state image sensor 6 is driven via the solid-state-image-sensor driving circuit 37 to start taking in continuous images for display. In the subsequent step S203, such a viewfinder display process is started that the images picked up by the solid-state image sensor 6 are displayed, as a moving image, on the liquid crystal display 7 via the reproduction processing circuit 34.

In step S205, the visual-line detection and AF control circuit 40 is instructed to detect the position of a fixation point of the viewfinder observer. In the next step S207, the visual-line detection and AF control circuit 40 is instructed to start an AF control subroutine. In the subsequent step S208, a check is made via the operation detecting circuit 36 to find if the release button 20 is in the on-state. If the release button 20 is in the off-state, the procedure returns to step S205. If the release button 20 is in the on-state, the procedure proceeds to step S209. In the step S209, with the release button 20 depressed, the solid-state image sensor 6 is driven in the first output mode by the solid-state-image-sensor driving circuit 37 to take in a high-definition image signal. Then, in step S210, image data subjected to the RGB image processing and the DC processing is recorded in an internal memory of the camera via the recording processing circuit 33. Thus, a series of control operations is brought to an end.

Figure 22:
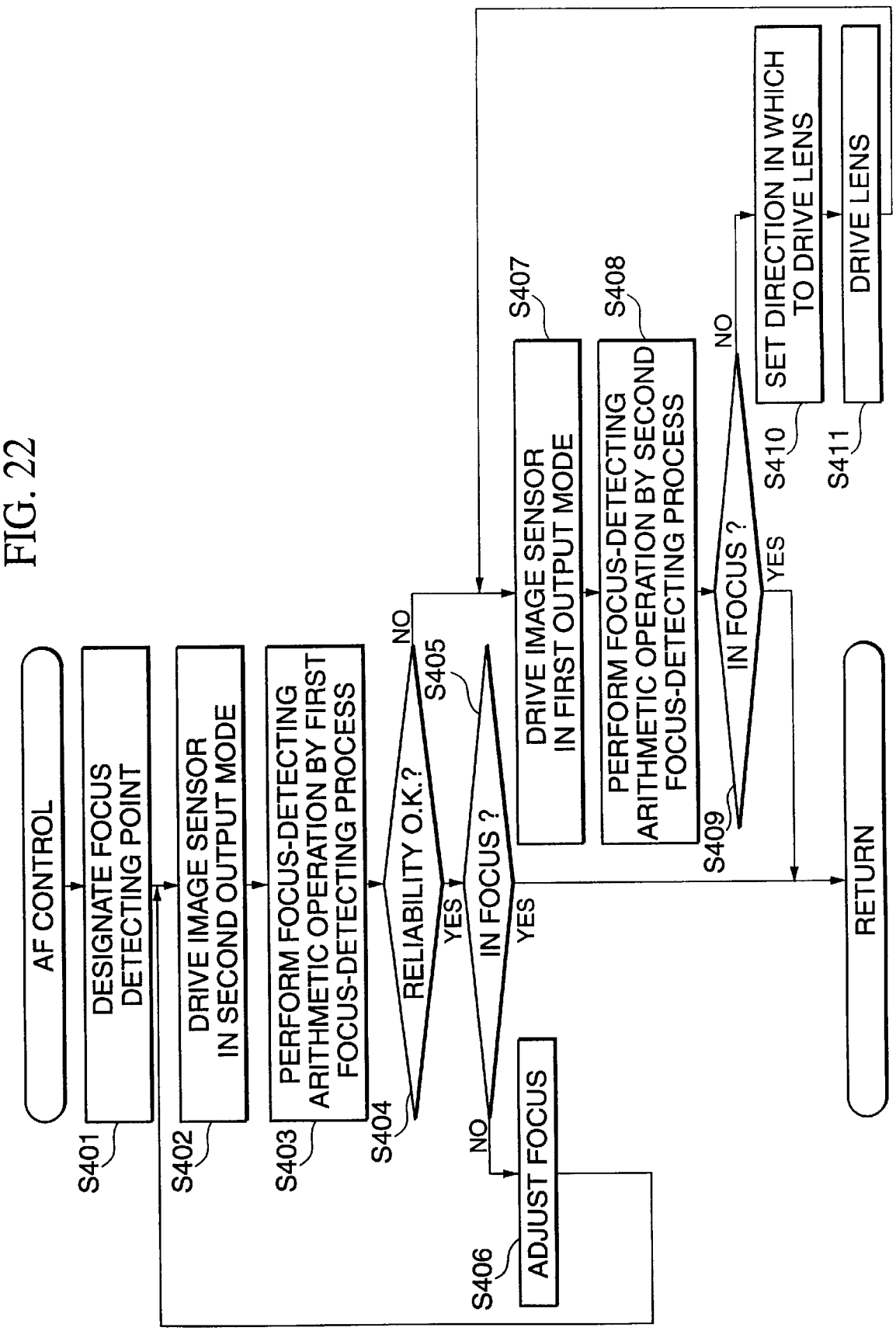
FIG. 22 is a flow chart showing the details of the AF control operation shown in FIG. 21.

The flow chart of FIG. 22 represents a control program written in the ROM disposed within the visual-line detection and AF control circuit 40, which includes the first focus detecting process using the phase-difference detection method and the second focus detecting process using the contrast detection method.

The focus detecting process is summarized as follows. First, the focus detection by the first focus detecting process is performed. If, as a result of this detection, the amount of defocus is detected with high reliability, a focus adjusting action is performed on the basis of the detected amount of defocus. If the amount of defocus is not detected with high reliability, the focus detection by the second focus detecting process is performed. In FIG. 22, the step S403 corresponds to the first focus detecting process, and the step S408 corresponds to the second focus detecting process.

Referring to FIG. 22, when the AF control subroutine is started, first, in step S401, a focus detecting point is designated on the fixation point on the basis of the result of visual-line detection performed in the step S205 shown in FIG. 21. Then, a rectangular area encompassing the focus detecting point on the solid-state image sensor 6 is set as an area from which an image signal for focus detection is to be taken in, and, further, is set as an area to be subjected to the focus detecting computation. Here, the rectangular area encompassing the focus detecting point is the focus detecting area 61a, 61b or the like.

In step S402, the solid-state image sensor 6 is driven in the second output mode, which is adapted for the first focus detecting process and in which the whole exit pupil is used, to acquire an image signal for focus detection. Then, in the next step S403, the focus detecting computation by the first focus detecting process is performed using the image signal for focus detection acquired in the step S402. Then, a change of the relative position between a first photoelectric transducing output (first image signal) obtained with a light flux passing through a divided portion of the exit pupil of the image forming lens 3 and a second photoelectric transducing output (second image signal) obtained with a light flux passing through another divided portion of the exit pupil of the image forming lens 3 is computed by the first computing means. The thus-obtained amount of defocus is converted into the amount of driving of the focusing lens.

In step S404, a check is made for the reliability of a result of the focus detecting computation obtained in the step S403. For the check for the reliability, at least one of the contrast of an image, the output level, the degree of coincidence obtained at the time of phase shifting, etc., is used as an evaluation value. For such an evaluation value, the one disclosed in Japanese Patent Publication No. Hei 5-88445 may be used. If the reliability exists, the procedure proceeds to step S405. If the reliability does not exist, the flow branches to step S407.

In the step S405, a check is made to find if the result of the focus detecting computation obtained in the step S404 indicates an in-focus state. If so, the procedure returns to the main routine from the AF control subroutine. If not, the procedure proceeds to step S406 to adjust the position of focus. In the step S406, the amount of driving of the focusing lens is transmitted to the lens system control circuit 41 via the camera system control circuit 35. Upon receipt of the amount of driving of the focusing lens, the lens system control circuit 41 moves the focusing lens along the optical axis L1 of the image forming lens 3 to perform focus adjustment. Then, the procedure returns to the step S402.

Next, a case where the procedure proceeds from the step S404 to the step S407 is described. In the step S407 and subsequent steps, since the first focus detecting process has failed in the above step S404, the second focus detecting process, in which the sensitivity is given to the contrast at least in a direction different from that of the first focus detecting process, is performed.

In the step S407, the solid-state image sensor 6 is driven in the first output mode to acquire an image signal for focus detection. While any one of the signals of the first and second output modes of the solid-state image sensor 6 may be used for performing the second focus detecting process, the use of the signal of the first output mode, in which the whole exit pupil of the image forming lens 3 is used, makes it possible to perform more accurate focus detection than the use of the signal of the second output mode. In the next step S408, the focus detecting computation by the second focus detecting process is performed using the image signal for focus detection acquired in the above step S407, so that the contrast evaluation value C is computed by the second computing means.

In the next step S409, a check is made for an in-focus state. Since, in the second focus detecting process, a check is made to find if the contrast evaluation value C has taken a maximum value, the checking operations for the first time and the second time are unconditionally made to indicate the decision of an out-of-focus, for the purpose of storing data. When data obtained the preceding three or more times has been stored, a check is made to find if a maximum value of the contrast evaluation value C is found on the basis of the relation between the amount of driving of the focusing lens and the contrast evaluation value C. Here, if the maximum value has been found, the maximum value of the contrast evaluation value C is considered to correspond to the in-focus position, the focusing lens is driven to return to the position where the maximum value has been found. Then, the procedure returns to the main routine from the AF control subroutine.

On the other hand, if the contrast evaluation value C is monotonously increasing or monotonously decreasing, the focusing state is determined to be an out-of-focus state. Then, the procedure proceeds to step S410. In the step S410, in respect of the relation between the amount of driving of the focusing lens and the contrast evaluation value C, a maximum value of the contrast evaluation value C is assumed to exist on the extension in the direction of increase of the contrast evaluation value C, and, then, a direction in which to drive the focusing lens next time is set. In the next step S411, the focusing lens is driven in the direction set in the above step S410. If, when the contrast evaluation value C obtained in the step S408 is small, the amount of driving of the focusing lens is made large, and, when the contrast evaluation value C obtained in the step S408 is large, the amount of driving of the focusing lens is made small, it is possible to speedily find the maximum value of the contrast evaluation value C. Then, the procedure returns to the step S407 to evaluate the contrast evaluation value C again.

What is claimed is:

1. A focus detecting device, comprising:
   a sensor part arranged to receive a light flux passing through an image forming lens, said sensor part including a first pixel part having pixels arrayed in a first direction and a second pixel part having pixels arrayed in a second direction different from the first direction; and
   a computing circuit arranged to obtain information for focusing by performing a phase-difference computing operation for computing a phase difference between two images formed with light fluxes passing through different exit pupils of the image forming lens on the basis of a signal obtained by the first pixel part and by performing a computing operation for evaluating a contrast state of an image on the basis of a signal obtained by the second pixel part, said computing operation for evaluating a contrast state of an image being different from the phase-difference computing operation.

2. A focus detecting device according to claim 1, wherein the first pixel part is composed of first and second pixel groups arranged to respectively receive two images formed with light fluxes passing through different exit pupils of the image forming lens, and computes a phase difference between a signal obtained by the first pixel group and a signal obtained by the second pixel group.

3. A focus detecting device according to claim 2, wherein the first direction and the second direction are orthogonal to each other.

4. A focus detecting device according to claim 1, wherein, if the information for focusing obtained by performing the phase-difference computing operation is inappropriate, said computing circuit performs the computing operation for evaluating the contrast state.

5. A focus detecting device, comprising:
   a sensor composed of a plurality of pixel units, each pixel unit having a first photoelectric transducing element and a second photoelectric transducing element;
   an optical element arranged to cause, among light fluxes passing through first and second exit pupils of an image forming lens, a light flux passing through the first exit pupil to be received by the first photoelectric transducing element of each pixel unit and to cause a light flux passing through the second exit pupil to be received by the second photoelectric transducing element; and
   a computing circuit arranged to compute a focusing state on the basis of a phase difference between a signal obtained by the first photoelectric transducing element of each pixel unit and a signal obtained by the second photoelectric transducing element of each pixel unit and arranged to compute a focusing state by using, as a signal for each pixel unit, a signal obtained by combining signals obtained by the first photoelectric transducing element and the second photoelectric transducing element of each pixel unit.

6. A focus detecting device according to claim 5, wherein said computing circuit computes a contrast state on the basis of a signal obtained by combining signals obtained by the first photoelectric transducing element and the second photoelectric transducing element of each pixel unit.

7. A focus detecting device according to claim 5, wherein said sensor has the plurality of pixel units arrayed in a first direction and in a second direction, and wherein a computing operation for a focusing state on the basis of a phase difference between a signal obtained by the first photoelectric transducing element of each pixel unit and a signal obtained by the second photoelectric transducing element of each pixel unit is performed by using the pixel units arrayed in the first direction, and a computing operation for a focusing state on the basis of a signal obtained by combining signals obtained by the first photoelectric transducing element and the second photoelectric transducing element of each pixel unit is performed by using the pixel units arrayed in the second direction.

8. A focus detecting device, comprising:
   a focus detecting control part having a first mode, for large defocus, of causing a member having two aperture parts to be located between an image forming lens and a sensor part and causing a light flux passing through the two aperture parts to be received by the sensor part, and a second mode, for small defocus, of causing a light flux passing through the image forming lens without passing through the two aperture parts to be received by the sensor part, said member in said second mode having one circular aperture provided in the image forming lens light flux; and a computing circuit arranged to detect a phase difference between two images received by the sensor part irrespective of the first mode or the second mode.

9. A focus detecting device according to claim 8, further comprising an optical element member arranged to cause light fluxes passing through two exit pupils of the image forming lens to be received by the sensor part.

10. A focus detecting device, comprising:

a sensor part composed of a plurality of pixel units, the plurality of pixels units including at least a first array in which a plurality of pixel units are arrayed in a first direction and a second array disposed parallel with the first array, each pixel unit having a first photoelectric transducing element and a second photoelectric transducing element, the plurality of pixel units constituting the first array being disposed in such a way as to receive a light flux passing through a first color filter at intervals of a predetermined number of pixel units, the plurality of pixel units constituting the second array being disposed in such a way as to receive a light flux passing through the first color filter at intervals of a predetermined number of pixel units, every pixel unit of the second array arranged to receive a light flux passing through the first color filter being shifted by a predetermined number of pixel units from every pixel unit of the first array arranged to receive a light flux passing through the first color filter;

an optical element arranged to cause, among light fluxes passing through first and second exit pupils of an image forming lens, a light flux passing through the first exit pupil to be received by the first photoelectric transducing element of each pixel unit and to cause a light flux passing through the second exit pupil to be received by the second photoelectric transducing element of each pixel unit; and a computing circuit arranged to obtain a phase difference on the basis of information on a phase difference between signals obtained by the first photoelectric transducing element and the second photoelectric transducing element of every pixel unit of the first array arranged to receive a light flux passing through the first color filter and information on a phase difference between signals obtained by the first photoelectric transducing element and the second photoelectric transducing element of every pixel unit of the second array arranged to receive a light flux passing through the first color filter.

11. A focus detecting device according to claim 10, wherein every pixel unit lying between pixel units of the first array arranged to receive a light flux passing through the first color filter is arranged to receive a light flux passing through a second color filter, and every pixel unit lying between pixel units of the second array arranged to receive a light flux passing through the first color filter is arranged to receive a light flux passing through a third color filter, and wherein said computing circuit obtains a phase difference between signals obtained by the first photoelectric transducing element and the second photoelectric transducing element of every pixel unit of the first array arranged to receive a light flux passing through the second color filter, and obtains a phase difference between signals obtained by the first photoelectric transducing element and the second photoelectric transducing element of every pixel unit of the second array arranged to receive a light flux passing through the third color filter.

* * * * *

UNITED STATES PATENT AND TRADEMARK OFFICE
CERTIFICATE OF CORRECTION

PATENT NO. : 6,597,868 B2  
DATED : July 22, 2003  
INVENTOR(S) : Yasuo Suda

It is certified that error appears in the above-identified patent and that said Letters Patent is hereby corrected as shown below:

Column 4,
Line 17, delete "positionally" and insert -- positional --.

Column 12,
Line 40 and 45, delete "positionally" and insert -- positional --.

Column 21,
Line 62, delete "DC" and insert -- YC --.

Signed and Sealed this

Twenty-second Day of June, 2004

JON W. DUDAS  
*Acting Director of the United States Patent and Trademark Office*